US012534912B2

(12) United States Patent
Rudisill et al.

(10) Patent No.: US 12,534,912 B2
(45) Date of Patent: *Jan. 27, 2026

(54) STRUCTURAL INSULATED SHEATHING PANEL AND METHODS OF USE AND MANUFACTURE THEREOF

(71) Applicant: HUBER ENGINEERED WOODS LLC, Charlotte, NC (US)

(72) Inventors: Reuben Claude Rudisill, Jefferson, GA (US); Nolan Michael Bowker, Athens, GA (US); Jianhua Pu, Bishop, GA (US); Danko Davidovic, Lawrenceville, GA (US); Patrick John Guilfoyle, Athens, GA (US); Allen Sealock, Huntersville, NC (US); Joel Barker, Townville, SC (US); Terry Liles, Commerce, GA (US)

(73) Assignee: HUBER ENGINEERED WOODS LLC, Charlotte, NC (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/462,866

(22) Filed: Aug. 31, 2021

(65) Prior Publication Data
US 2021/0396010 A1      Dec. 23, 2021

Related U.S. Application Data

(60) Continuation-in-part of application No. 16/794,568, filed on Feb. 19, 2020, which is a continuation of
(Continued)

(51) Int. Cl.
*E04C 2/24* (2006.01)
*B32B 9/02* (2006.01)
(Continued)

(52) U.S. Cl.
CPC ............... *E04C 2/243* (2013.01); *B32B 9/02* (2013.01); *B32B 9/046* (2013.01); *B32B 9/06* (2013.01);
(Continued)

(58) Field of Classification Search
CPC .... B32B 3/06; B32B 3/08; B32B 3/30; B32B 5/18; B32B 7/12; B32B 15/08;
(Continued)

(56) References Cited

U.S. PATENT DOCUMENTS

| 1,257,144 A | 2/1918 | Stanwood |
| 1,534,511 A | 4/1925 | Frederiksen |

(Continued)

FOREIGN PATENT DOCUMENTS

| CA | 1181565 | 1/1985 |
| CA | 1189434 | 6/1985 |

(Continued)

OTHER PUBLICATIONS

Abrams, J. "High-Performance Homes on a Budget," JLC, Jan. 2011, pp. 1-8.
(Continued)

*Primary Examiner* — Brent W Herring
(74) *Attorney, Agent, or Firm* — Perilla Knox & Hildebrandt LLP

(57) ABSTRACT

Structural insulated wall and roof sheathing systems for use in building construction designed to provide a structural building envelope that is moisture permeable but protects from bulk water, excess air, and thermal transfer.

20 Claims, 14 Drawing Sheets

Related U.S. Application Data application No. 14/982,780, filed on Dec. 29, 2015, now Pat. No. 10,570,616, which is a division of application No. 13/907,628, filed on May 31, 2013, now Pat. No. 9,234,355.

(60) Provisional application No. 61/654,064, filed on May 31, 2012.

(51) Int. Cl.

| | | |
|---|---|---|
| *B32B 9/04* | (2006.01) | |
| *B32B 9/06* | (2006.01) | |
| *E04B 1/76* | (2006.01) | |
| *E04B 1/80* | (2006.01) | |
| *E04B 2/00* | (2006.01) | |
| *E04B 2/70* | (2006.01) | |
| *E04B 5/02* | (2006.01) | |
| *E04C 2/00* | (2006.01) | |
| *E04C 2/16* | (2006.01) | |
| *E04C 2/20* | (2006.01) | |
| *E04C 2/38* | (2006.01) | |
| *E04F 13/08* | (2006.01) | |

(52) U.S. Cl.
CPC ............... *E04B 1/762* (2013.01); *E04B 1/80* (2013.01); *E04B 2/707* (2013.01); *E04C 2/00* (2013.01); *E04C 2/16* (2013.01); *E04C 2/205* (2013.01); *E04C 2/246* (2013.01); *E04C 2/38* (2013.01); *E04C 2/46* (2013.01); *E04C 2/50* (2013.01); *E04F 13/08* (2013.01); *B32B 2307/724* (2013.01); *B32B 2307/7265* (2013.01); *E04B 2001/7691* (2013.01); *Y10T 428/233* (2015.01); *Y10T 428/239* (2015.01)

(58) Field of Classification Search
CPC ......... B32B 15/10; B32B 15/12; B32B 15/20; B32B 21/02; B32B 21/047; B32B 21/06; B32B 29/06; B32B 2255/08; B32B 2255/26; B32B 2260/028; B32B 2260/046; B32B 2266/0228; B32B 2266/0278; B32B 2307/304; B32B 2307/54; B32B 2307/542; B32B 2307/72; B32B 2307/732; B32B 2307/734; B32B 2307/744; B32B 2419/06; B32B 2607/00; B32B 9/02; B32B 9/046; B32B 9/06; B32B 2307/724; B32B 2307/7265; E04F 13/0866; E04F 13/0875; E04F 13/08; E04F 13/16; E04B 1/0007; E04B 2/707; E04B 1/10; E04B 1/665; E04B 1/6806; E04B 1/762; E04B 1/80; E04B 2001/7691; E04D 3/352; E04D 3/355; E04C 2/243; E04C 2/00; E04C 2/16; E04C 2/205; E04C 2/246; E04C 2/38; E04C 2/46; E04C 2/50; Y10T 428/233; Y10T 428/239

See application file for complete search history.

(56) References Cited

U.S. PATENT DOCUMENTS

| | | |
|---|---|---|
| 1,776,254 A | 9/1930 | Finley |
| 2,044,782 A | 6/1936 | Harshberger |
| 2,144,168 A | 1/1939 | Sherriff |
| 2,226,239 A | 12/1940 | Elmendorf |
| 2,246,514 A | 6/1941 | Harris |
| 2,858,236 A | 10/1958 | Asselin et al. |
| 3,041,219 A | 6/1962 | Steck |
| 3,094,447 A | 6/1963 | Chamberlain |
| 3,111,787 A | 11/1963 | Chamberlain |
| 3,266,206 A | 8/1966 | Cosby et al. |
| 3,284,967 A | 11/1966 | Elliott et al. |
| 3,402,520 A | 9/1968 | Lee et al. |
| 3,411,256 A | 11/1968 | Best |
| 3,448,001 A | 6/1969 | Jarvi et al. |
| 3,468,086 A | 9/1969 | Warner |
| 3,522,138 A | 7/1970 | Lee |
| 3,654,044 A | 4/1972 | Hirota |
| 3,666,593 A | 5/1972 | Lee |
| 3,851,427 A | 12/1974 | Lacoste, III |
| 3,900,102 A | 8/1975 | Hurst |
| 3,909,998 A | 10/1975 | Simpson et al. |
| 3,934,066 A | 1/1976 | Murch |
| 3,969,181 A | 7/1976 | Seabold |
| 4,021,981 A | 5/1977 | Wagoner |
| 4,053,339 A | 10/1977 | Story et al. |
| 4,132,220 A | 1/1979 | Thomason |
| 4,160,346 A | 7/1979 | Kaufmann |
| 4,172,830 A | 10/1979 | Rosenberg et al. |
| 4,194,335 A | 3/1980 | Diamond |
| 4,252,767 A | 2/1981 | Piazza et al. |
| 4,326,909 A | 4/1982 | Slavik |
| 4,404,252 A | 9/1983 | Hetzler et al. |
| 4,405,675 A | 9/1983 | Dessens |
| 4,415,324 A | 11/1983 | Henckel et al. |
| 4,443,988 A | 4/1984 | Coutu, Sr. |
| 4,555,292 A | 11/1985 | Thompson |
| 4,564,554 A | 1/1986 | Mikuski |
| 4,581,384 A | 4/1986 | Marion |
| 4,590,733 A | 5/1986 | Schneller et al. |
| 4,601,935 A | 7/1986 | Metcalf |
| 4,646,498 A | 3/1987 | Schneller et al. |
| 4,689,275 A | 8/1987 | Sandman |
| 4,719,723 A | 1/1988 | Van Wagoner |
| 4,775,567 A | 10/1988 | Harkness |
| 4,786,547 A | 11/1988 | St-Michel |
| 4,825,616 A | 5/1989 | Bondoc et al. |
| 4,828,635 A | 5/1989 | Flack et al. |
| 4,852,311 A | 8/1989 | Lee |
| 4,852,314 A | 8/1989 | Moore, Jr. |
| 4,888,930 A | 12/1989 | Kelly |
| 4,924,644 A | 5/1990 | Lewis |
| 4,929,303 A | 5/1990 | Sheth |
| 4,936,071 A | 6/1990 | Karrfalt |
| 4,937,992 A | 7/1990 | Dawson et al. |
| 4,965,119 A | 10/1990 | Sancaktar |
| 4,974,382 A | 12/1990 | Avellanet |
| 4,992,315 A | 2/1991 | Zickell et al. |
| 4,992,331 A | 2/1991 | DeCoste |
| 5,011,866 A | 4/1991 | Suh |
| 5,061,258 A | 10/1991 | Martz |
| 5,093,185 A | 3/1992 | Ungar et al. |
| 5,096,759 A | 3/1992 | Simpson et al. |
| 5,134,831 A | 8/1992 | Avellant |
| 5,143,768 A | 9/1992 | Wilderman et al. |
| 5,147,486 A | 9/1992 | Hoffman |
| 5,187,000 A | 2/1993 | Chow et al. |
| 5,220,760 A | 6/1993 | Dimakis |
| 5,231,814 A | 8/1993 | Hageman |
| 5,236,757 A | 8/1993 | Probst et al. |
| 5,251,416 A | 10/1993 | White |
| 5,259,236 A | 11/1993 | English |
| 5,270,119 A | 12/1993 | Yanutola |
| 5,317,035 A | 5/1994 | Jacoby et al. |
| 5,335,473 A | 8/1994 | Chase |
| 5,345,738 A | 9/1994 | Dimakis |
| 5,374,477 A | 12/1994 | Lawless et al. |
| 5,384,994 A | 1/1995 | Borba |
| 5,425,976 A | 6/1995 | Clarke et al. |
| 5,497,596 A | 3/1996 | Zatkulak |
| 5,515,659 A | 5/1996 | MacDonald et al. |
| 5,617,687 A | 4/1997 | Bussey et al. |
| 5,632,095 A | 5/1997 | Day |
| 5,646,419 A | 7/1997 | McCaldin et al. |
| 5,647,934 A | 7/1997 | Vaders et al. |
| 5,661,937 A | 9/1997 | Doppler et al. |
| 5,687,517 A | 11/1997 | Wiercinski et al. |
| 5,695,870 A | 12/1997 | Kelch et al. |

(56) References Cited

U.S. PATENT DOCUMENTS

| | | |
|---|---|---|
| 5,700,570 A | 12/1997 | Fahmy |
| 5,711,124 A | 1/1998 | Stough et al. |
| 5,718,786 A | 2/1998 | Lindquist et al. |
| 5,732,520 A | 3/1998 | Maietta |
| 5,735,092 A | 4/1998 | Clayton et al. |
| 5,755,067 A | 5/1998 | Mercurio |
| 5,759,670 A | 6/1998 | Bussey et al. |
| 5,766,721 A | 6/1998 | Bussey et al. |
| 5,787,665 A | 8/1998 | Carlin et al. |
| 5,822,940 A | 10/1998 | Carlin et al. |
| 5,837,620 A | 11/1998 | Kajander |
| 5,843,552 A | 12/1998 | Karrfalt |
| 5,859,114 A | 1/1999 | Davis et al. |
| 5,881,521 A | 3/1999 | Porter et al. |
| 5,891,282 A | 4/1999 | Stough et al. |
| 5,891,563 A | 4/1999 | Letts |
| 5,953,883 A | 9/1999 | Ojala |
| 5,955,203 A | 9/1999 | Briggs et al. |
| 5,989,668 A | 11/1999 | Nelson et al. |
| 6,018,918 A | 2/2000 | Long, Sr. |
| 6,023,906 A | 2/2000 | Folkersen |
| 6,044,604 A | 4/2000 | Clayton et al. |
| 6,115,926 A | 9/2000 | Robell |
| 6,120,869 A | 9/2000 | Cotsakis et al. |
| 6,131,353 A | 10/2000 | Egan |
| 6,133,168 A | 10/2000 | Doyle et al. |
| 6,187,127 B1 | 2/2001 | Bolitsky et al. |
| 6,205,729 B1 | 3/2001 | Porter |
| 6,209,283 B1 | 4/2001 | Folkersen |
| 6,209,284 B1 | 4/2001 | Porter |
| 6,235,365 B1 | 5/2001 | Schaughency et al. |
| 6,240,704 B1 | 6/2001 | Porter |
| 6,251,495 B1 | 6/2001 | Wilson et al. |
| 6,253,530 B1 | 7/2001 | Price et al. |
| 6,269,608 B1 | 8/2001 | Porter |
| 6,279,284 B1 | 8/2001 | Moras |
| 6,293,069 B1 | 9/2001 | Monda et al. |
| 6,303,207 B1 | 10/2001 | Kajander |
| 6,308,491 B1 | 10/2001 | Porter |
| 6,331,339 B1 | 12/2001 | Kajander |
| 6,355,333 B1 | 3/2002 | Waggoner et al. |
| 6,408,594 B1 | 6/2002 | Porter |
| 6,418,683 B1 | 7/2002 | Martensson et al. |
| 6,455,151 B1 | 9/2002 | Sakashita et al. |
| 6,481,172 B1 | 11/2002 | Porter |
| 6,523,324 B1 | 2/2003 | Porter |
| 6,526,676 B1 | 3/2003 | Ledergerber |
| 6,536,176 B1 | 3/2003 | Nordgren et al. |
| 6,564,521 B1 | 5/2003 | Brown et al. |
| 6,578,331 B1 | 6/2003 | Leslie et al. |
| 6,581,348 B2 | 6/2003 | Hunter |
| 6,584,742 B1 | 7/2003 | Kigler et al. |
| 6,588,172 B2 | 7/2003 | Porter |
| 6,599,621 B2 | 7/2003 | Porter |
| 6,656,858 B1 | 12/2003 | Cahill |
| 6,675,544 B1 | 1/2004 | Ou et al. |
| 6,701,685 B2 | 3/2004 | Rippey |
| 6,715,249 B2 | 4/2004 | Rusek et al. |
| 6,737,155 B1 | 5/2004 | Ou |
| 6,745,535 B2 | 6/2004 | Nordgren et al. |
| 6,769,215 B1 | 8/2004 | Carkner |
| 6,772,569 B2 | 8/2004 | Bennett et al. |
| 6,799,403 B2 | 10/2004 | Winter |
| 6,800,361 B2 | 10/2004 | Bruce et al. |
| 6,804,922 B1 | 10/2004 | Egan |
| 6,840,372 B2 | 1/2005 | Giles et al. |
| 6,854,228 B2 | 2/2005 | Arseneau et al. |
| 6,868,643 B1 | 3/2005 | Williams |
| 6,892,498 B1 | 5/2005 | Roman |
| 6,901,712 B2 | 6/2005 | Lionel |
| 6,901,713 B2 | 6/2005 | Axsom |
| 6,925,766 B2 | 8/2005 | Di Pede |
| 6,926,785 B2 | 8/2005 | Tanzer et al. |
| 6,931,809 B1 | 8/2005 | Brown et al. |
| 6,988,343 B2 | 1/2006 | Gleeson et al. |
| 7,021,018 B2 | 4/2006 | Peng |
| 7,037,864 B2 | 5/2006 | Faucher |
| 7,082,733 B2 | 8/2006 | Nordgren et al. |
| 7,093,397 B2 | 8/2006 | Nordgren et al. |
| 7,100,337 B1 | 9/2006 | Nordgren et al. |
| 7,127,856 B2 | 10/2006 | Hagen et al. |
| 7,148,160 B2 | 12/2006 | Porter |
| 7,150,128 B2 | 12/2006 | Schuman et al. |
| 7,152,383 B1 | 12/2006 | Wilkinson, Jr. et al. |
| 7,155,868 B2 | 1/2007 | Cole et al. |
| 7,159,368 B2 | 1/2007 | Peng |
| 7,183,339 B2 | 2/2007 | Shen et al. |
| RE39,761 E | 8/2007 | Cahill |
| 7,343,716 B2 | 3/2008 | Nordgren et al. |
| 7,378,044 B1 | 5/2008 | Hejna et al. |
| 7,487,624 B2 | 2/2009 | Baba |
| 7,501,357 B2 | 3/2009 | Carroll et al. |
| 7,550,187 B2 | 6/2009 | Seth et al. |
| 7,658,038 B2 | 2/2010 | Mower et al. |
| 7,658,040 B2 | 2/2010 | Bennett et al. |
| 7,677,002 B2 | 3/2010 | Bennett et al. |
| 7,721,506 B2 | 5/2010 | Bennett et al. |
| 7,829,197 B2 | 11/2010 | Chen et al. |
| 7,838,104 B2 | 11/2010 | Chen et al. |
| 7,838,123 B2 | 11/2010 | Chen et al. |
| 7,849,659 B2 | 12/2010 | Kopshever, Sr. |
| 7,866,100 B2 | 1/2011 | Bennett et al. |
| 7,870,694 B2 | 1/2011 | Bennett et al. |
| 7,877,938 B2 | 2/2011 | Bennett et al. |
| 7,895,796 B2 | 3/2011 | Baldock et al. |
| 7,972,981 B2 | 7/2011 | Anderson et al. |
| 7,984,591 B2 | 7/2011 | Cashin et al. |
| 8,112,950 B2 | 2/2012 | Bennett et al. |
| 8,215,083 B2 | 7/2012 | Toas et al. |
| 8,222,164 B2 | 7/2012 | Anderson et al. |
| 8,328,968 B2 | 12/2012 | Anderson et al. |
| 8,474,197 B2 | 7/2013 | Bennett et al. |
| 8,590,217 B2 | 11/2013 | Gleeson et al. |
| 8,590,267 B2 | 11/2013 | Jaffee |
| 8,966,843 B2 | 3/2015 | Paul et al. |
| 9,010,044 B2 | 4/2015 | Bennett et al. |
| 9,051,014 B2 | 6/2015 | Lookebill et al. |
| 9,382,713 B2 | 7/2016 | Bennett et al. |
| 9,546,479 B2 | 1/2017 | Bennett et al. |
| 9,689,159 B2 | 6/2017 | Bennett et al. |
| 9,695,588 B2 | 7/2017 | Bennett et al. |
| 9,702,140 B2 | 7/2017 | Bennett et al. |
| 9,895,824 B2 | 2/2018 | Borowka et al. |
| 10,072,415 B2 | 9/2018 | Bennett et al. |
| 10,316,515 B2 | 6/2019 | Budinscak, Jr. et al. |
| 10,415,245 B2 | 9/2019 | Bennett et al. |
| 11,536,028 B2 | 12/2022 | Bennett et al. |
| 2001/0010141 A1 | 8/2001 | Folkerson |
| 2001/0021448 A1 | 9/2001 | Kajander |
| 2001/0028943 A1 | 10/2001 | Mashiko et al. |
| 2002/0100249 A1 | 8/2002 | Peng et al. |
| 2002/0132547 A1 | 9/2002 | Grondin et al. |
| 2002/0136915 A1 | 9/2002 | Sano et al. |
| 2002/0194807 A1 | 12/2002 | Nelson et al. |
| 2003/0054127 A1 | 3/2003 | Heifetz |
| 2003/0089070 A1 | 5/2003 | Wall |
| 2003/0113534 A1 | 6/2003 | Poisson |
| 2003/0126817 A1 | 7/2003 | Gleeson et al. |
| 2003/0129348 A1 | 7/2003 | Peng |
| 2003/0131550 A1 | 7/2003 | Cole et al. |
| 2003/0145551 A1 | 8/2003 | Grant |
| 2003/0163959 A1 | 9/2003 | Deming |
| 2003/0199217 A1 | 10/2003 | Cashin et al. |
| 2004/0029469 A1 | 2/2004 | Anderson et al. |
| 2004/0071927 A1 | 4/2004 | Murphy et al. |
| 2004/0103608 A1 | 6/2004 | Borenstein |
| 2004/0123555 A1 | 7/2004 | Cole |
| 2004/0137819 A1 | 7/2004 | Faucher |
| 2004/0180195 A1 | 9/2004 | Mauga |
| 2004/0226247 A1 | 11/2004 | Byrd |
| 2005/0011155 A1 | 1/2005 | Ponting et al. |
| 2005/0055973 A1 | 3/2005 | Hagen et al. |
| 2005/0076611 A1 | 4/2005 | Crawford |
| 2005/0118446 A1 | 6/2005 | Faucher |

(56) References Cited

U.S. PATENT DOCUMENTS

| | | |
|---|---|---|
| 2005/0229504 A1 | 10/2005 | Bennett et al. |
| 2005/0229524 A1 | 10/2005 | Bennett et al. |
| 2005/0257469 A1 | 11/2005 | Bennett et al. |
| 2006/0019568 A1 | 1/2006 | Toas et al. |
| 2006/0034381 A1 | 2/2006 | Ionescu et al. |
| 2006/0053737 A1 | 3/2006 | Jaffee |
| 2006/0053738 A1 | 3/2006 | Jaffee |
| 2006/0053739 A1 | 3/2006 | Jaffee |
| 2006/0059852 A1 | 3/2006 | Toas et al. |
| 2006/0096213 A1 | 5/2006 | Griffin et al. |
| 2006/0141191 A1 | 6/2006 | Seth et al. |
| 2006/0201089 A1 | 9/2006 | Duncan et al. |
| 2006/0207204 A1 | 9/2006 | Wasitis et al. |
| 2006/0236641 A1 | 10/2006 | Nordgren et al. |
| 2007/0015424 A1 | 1/2007 | Toas et al. |
| 2007/0125475 A1 | 6/2007 | Cecilio et al. |
| 2007/0178793 A1 | 8/2007 | Gerello |
| 2007/0234667 A1 | 10/2007 | Lubker et al. |
| 2007/0261340 A1 | 11/2007 | Cecilio et al. |
| 2008/0098667 A1 | 5/2008 | Williams |
| 2008/0145681 A1 | 6/2008 | Toas |
| 2008/0245007 A1 | 10/2008 | McDonald |
| 2008/0282632 A1 | 11/2008 | Sleeman |
| 2008/0313991 A1 | 12/2008 | Chouinard |
| 2009/0098357 A1 | 4/2009 | Bergtold et al. |
| 2009/0113830 A1 | 5/2009 | Clark et al. |
| 2009/0202852 A1 | 8/2009 | Chen |
| 2010/0028668 A1 | 2/2010 | Janda et al. |
| 2010/0095607 A1 | 4/2010 | Bennett et al. |
| 2010/0132294 A1 | 6/2010 | Bennett et al. |
| 2010/0170178 A1 | 7/2010 | Bennett et al. |
| 2011/0120049 A1 | 5/2011 | Leo |
| 2011/0135879 A1 | 6/2011 | Bennett et al. |
| 2011/0197528 A1 | 8/2011 | Egan et al. |
| 2011/0239851 A1 | 10/2011 | Mason et al. |
| 2011/0247286 A1 | 10/2011 | Houle |
| 2011/0268916 A1 | 11/2011 | Pardue, Jr. |
| 2011/0269363 A1 | 11/2011 | Cashin et al. |
| 2011/0300386 A1 | 12/2011 | Pardue, Jr. |
| 2012/0011792 A1 | 1/2012 | Dewildt et al. |
| 2012/0079785 A1 | 4/2012 | Bennett et al. |
| 2013/0026172 A1 | 1/2013 | Asakawa et al. |
| 2013/0055669 A1 | 3/2013 | Olszewski et al. |
| 2013/0082414 A1 | 4/2013 | Anderson et al. |
| 2013/0283715 A1 | 10/2013 | Bennett et al. |
| 2013/0305641 A1 | 11/2013 | Sleeman |
| 2016/0069067 A1 | 3/2016 | Ciuperca |
| 2017/0022704 A1 | 1/2017 | Bertucelli et al. |
| 2020/0147930 A1 | 5/2020 | Shake et al. |
| 2020/0171797 A1 | 6/2020 | Shake et al. |
| 2020/0299968 A1 | 9/2020 | Brandt et al. |
| 2020/0331236 A1 | 10/2020 | Shake et al. |

FOREIGN PATENT DOCUMENTS

| | | |
|---|---|---|
| DE | 10120810 | 11/2001 |
| DE | 102008031859 | 1/2010 |
| FR | 2422898 | 11/1979 |
| FR | 2583337 | 12/1986 |
| GB | 2364338 | 4/2001 |
| GB | 2429219 | 2/2007 |
| JP | 11290771 | 4/1998 |
| JP | 2001020415 | 1/2001 |
| JP | 2003276008 | 9/2003 |
| MY | 122497 | 4/2006 |
| WO | 1999029978 | 6/1999 |
| WO | 02103099 | 12/2002 |
| WO | 2003091508 | 11/2003 |
| WO | 2006034381 | 3/2006 |
| WO | 2011101546 | 8/2011 |
| WO | 2013026172 | 2/2013 |

OTHER PUBLICATIONS

Weinstein, N., "Ply-on-foam walls increase energy efficiency," Daily Journal of Commerce Oreqon, <website citation>, Mar. 8, 2010, pp. 1-2.
Madrigal, E., "Portland's Green Building Rock Star," Green Landlady, <website citation>, Auqust 6, 2010, pp. 1-4.
"What is ZIP System Wall Sheathing?," Huber Engineered Woods, Technical Tip, Oct. 2010, DD. 1.
"Allowable Shear Capacity for ZIP System Wall Panels," Huber Engineered Woods, Technical Tip, Oct. 2011, DD. 1.
"Spray Foam Insulation with ZIP System Sheathing," Huber Engineered Woods, Technical Tip, Nov. 2010, pp. 1.
"ICC-ES Evaluation Report—ESR-3373," ICC-Evaluation Service, Jun. 1, 2012, DD. 1-3.
"ACFOAM Nail Base," Atlas Roofinq Corporation, Product Data Sheet, May 21, 2009, DD. 1-2.
"Water Resistive Barrier System," Atlas Roofing Corporation, Installation Guide, Nov. 3, 2009, pp. 1-2.
"Insulating Sheathing Installation Guide," Atlas Roofing Corporation, Installation Guide, Aug. 12, 2010, pp. 1-8.
"Sheathing Products," Atlas Roofing Corporation, Product Brochure, Aug. 12, 2010, pp. 1-8.
"Atlas Insulating Sheathing," Atlas Roofing Corporation, Product Data Sheet, Aug. 12, 2010, pp. 1-2.
"APA Panel Handbook Grade Glossary", 1997, pp. 1-32.
"Construction and Industrial Plywood Voluntary Product Standard PS1-95", Mar. 1996, pp. 1-49.
"Joint Claim Construction Chart", Jan. 21, 2020, pp. 1-26.
"English Translation of JP 2001020415", Feb. 14, 2020, pp. 1-8.
"Wayback Machine Internet Archive for Grace", Jan. 3, 2020, pp. 1.
"US Copyright Catalogue Entry for the APA Handbook", Feb. 5, 2020, pp. 1.
"Merriam-Webster Definition of "polymer"", Feb. 12, 2020, pp. 1-9.
"Patent Owner Response in IPR2019-00919", Jan. 16, 2020, pp. 1-77.
"Moisture Control for Buildings," 2002 ("Lstiburek").
LP Test Report T011035, Aug. 2001.
LP Test Report—Hybrid PBO TH, May 2002.
LP Test Report—Hybrid PBO SB TH, Jul. 2002.
LP Test Report—Portland Hybrid TK, Nov. 2002.
LP Test Report—Portland PBO TH, Jun. 2003.
LP Test Report—70lb PBO, Sep. 2003.
LP Test Report—Portland Hybrid NB, Jan. 2003.
LP Test Report—2001 Table.
Laks Declaration, published at least by Apr. 3, 2019, 32 pgs.
Prosecution History, published at least by Apr. 3, 2019, 139 pgs.
APA Handbook, published at least by Apr. 3, 2019, 133 pgs.
ASTM D5795-00, published at least by Apr. 3, 2019, 3 pgs.
D01-1093, published at least by Apr. 3, 2019, 10 pgs.
Building in Alaska, published at least by Apr. 3, 2019, 6 pgs.
Dupont Tyvek Tape, published at least by Apr. 3, 2019, 2 pgs.
Edward Allen—Fundamentals of Building Construction Materials and Methods, published at least by Apr. 3, 2019, 9 pgs.
LP SmartSide, published at least by Apr. 3, 2019, 4 pgs.
ICBO—ES Report, published at least by Apr. 3, 2019, 7 pgs.
SmartSide—Application Instructions, published at least by Apr. 3, 2019, 8 pgs.
Sto Guard Press Release Archive 2001, published at least by Apr. 3, 2019, 1 pg.
Sto Guard Press Release Archive 2003, published at least by Apr. 3, 2019, 2 pgs.
Madrigal, E., "Portland's Green Building Rock Star," Green Landlady, <website citation>, Aug. 6, 2010, pp. 1-4.
Huber Engineered Woods, PerformMAX™ 500 Product Sheet (Huber Reference HUB 208), first sale date Sep. 21, 2000.
Huber Engineered Woods tri-fold pamphlets with product overview including PerformMAX™ (Huber Reference HUB 22), first sale date Sep. 21, 2000.
CoFair Products, Inc., Tite-Seal™ Self-Adhesive Waterproof Flashing Flyer, Jan. 4, 2005.

(56) References Cited

OTHER PUBLICATIONS

Arnold et al., Installing Housewrap, When properly detailed, high-tech wrappings can reduce the flow of air into outside walls while allowing moisture to escape, Fine Homebuilding, Feb./Mar. 1997, No. 107, pp. 44-47.
Energy Source Builder, Wall Sheathing Seam Tape, Oikos, Energy Source Builder #39, Jun. 1995, Iris Communications, Inc.
TiteSeal®,Roof Deck Seam Tape, http://www.cofair.com/sheathingtape.aspx, CoFair Products Inc. Feb. 1, 2011. 1 page.
Information Disclosure Statement, filed by Georgia-Pacific on Apr. 13, 2015 under U.S. Appl. No. 14/065,580, 14 pages.
United States District Court for the Western District of North Carolina. Complaint regarding *Huber Engineered Woods LLC* vs. *Georgia-Pacific Wood Products LLC*. Civil Action No. 3:16-cv-399. Filed Jun. 17, 2016. 87 Pages.
United States District Court for the Western District of North Carolina. Declaration of S. Benjamin Pleune in Support of Defendant Georgia-Pacific Wood Products LLC's Motion to Dismiss or, in the Alternative, Transfer. Civil Action No. 3:16-cv-00399-FDW. Filed Aug. 1, 2016. 4 Pages.
United States District Court for the Western District of North Carolina. Defendant Georgia-Pacific Wood Products LLC's Answer, Affirmative Defenses, and Counterclaims to Plaintiff Huber Engineered Woods LLC's Complaint. Civil Action No. 3:16-cv-00399-FDW. Filed Aug. 1, 2016. 19 Pages.
Answer and Counterclaim Exhibit 1. Civil Action No. 3:16-cv-00399-FDW. U.S. Pat. No. 9,382,713. Filed Aug. 1, 2016. 29 Pages.
United States District Court for the Western District of North Carolina. First Amended Complaint regarding *Huber Engineered Woods LLC* vs. *Georgia-Pacific Wood Products LLC*. Civil Action No. 3:16-cv-00399-FDW. Filed Aug. 16, 2016. 22 Pages.
Yoong Hau Chun, Market Potential of Oriented Strand Board (OSB) & Laminated OSB (Lami-OSB) in Asia Pacific (Thesis), Universiti Putra Malaysia, May 2001, 56 pages.
Georgia-Pacific, GP Camo Panel Featuring Mossy Oak, 2010, 2 pages.
Ludlow Coated Products, Thermo-Ply Sheathing Technical Specifications Sheet, Available at least as early as Jan. 4, 2015, 2 pages.
Department of Housing and Urban Development. Thermo-Ply Stormbrace Laminated Kraft Paperboard, Nov. 21, 2005, 6 pages.
Building 46.1, High performance walls (IDEAS Challenge), Copyright Crailer Communications, Feb./Mar. 1996.
Dryvit Systems, Inc., DS224, Infinity® System: A Patented Pressure-Equalized Rainscreen Exterior Insulation and Finish System That Incorporates Continuous Insulation and an Air/Water-Resistive Barrier, 1997.
Dryvit Systems, Inc., DS224, The Infinity® Wall System: The pressure equalized rainscreen engineered to prevent water infiltration, 1997.
Boston Globe; Matt Carroll; "Luxury by Design, Quality by Chance: Wall Sheathing Creates Headaches for Builder, Homeowners"; May 1, 2001.
OHCD-PHDC-RDA Constructions Specifications; Thermal and Moisture Protection; May 2001.
ICC Evaluation Service; ICC-ES Legacy Report ER-1439; Jul. 2001.
Clemson University; Holding on to Your Roof; Nov. 2001.
Sea Grant North Carolina; Coastwatch; Ann Green; "Hurricane Resistance: Retrofitting, Storm Shutters Increase Safety"; Early Summer 2002.
APA; HDO/MDO Plywood Product Guide; 2002.
ICC Evaluation Service, Inc.; Acceptance Criteria for Foam Plastic Sheathing Panels Used as Weather-Resistive Barriers; Feb. 2003.
Modern Materials; Deniz Carroll; "The Expanding Role of EPS in Construction"; Nov. 2003.
ICC Public Hearing; Code Change Proposals, RB251-RB270; Sep. 2006.
Building Science Press; Building Science Digest 105; Joseph Lstiburek; "Understanding Drainage Planes"; Oct. 24, 2006.
RoyOMartin; Exterior Sheathing; Dec. 15, 2010.
OHCD/PHDC/RDA Small Building Specifications; May 2011.
LSU College of Agriculture; Hazard Resistant: Wind-resistant Roofs and Attachments; Jul. 26, 2011.
APA; HDO/MDO Plywood Product Guide; 2011.
LSU College of Agriculture; Teaching Center Roof No. 2; Feb. 29, 2012.
ICC Evaluation Service; ICC-ES Evaluation Report ER-3063; Aug. 2013.
Energy Vanguard Blog; Allison Bailes; "6 Materials that Drain the Rain on the Plane and Keep a House Dry"; Jan. 27, 2014.
RoyOMartin; Eclipse Reflective Housewrap Product Information and Installation Manual 01; Mar. 2015.
RoyOMartin; Eclipse Reflective Housewrap; Webpage, https://products.royomartin.com/eclipse; Before Apr. 2015.
RoyOMartin; FSC-Certified Products; Webpage, https://products.royomartin.com/products/fscr-certified-products; Before Apr. 2015.
Sto Technical Report 01-07.3—StoGuard: Testing for International Building Code Compliance and Comparison to Sheet Water-Resistive Barrier Products; Before Apr. 2015.
Energy-Efficient Building—The Best of Fine Homebuilding, pp. 110-121, 1999, Taunton Press, Inc., Newtown, Connecticut.
Encyclopedia Britannica—Polyolefin, published at least by Apr. 3, 2019, 4 pgs.
ASHRAE Journal—Moisture Control for Buildings, published at least by Apr. 3, 2019, 7 pgs.
TECO—OSB Design and Application Guide, published at least by Apr. 3, 2019, 35 pgs.
Wall Sheathing Seam Tape, published at least by Apr. 3, 2019, 2 pgs.
Installing Housewrap, published at least by Apr. 3, 2019, 6pgs.
Performance of Southern OSB Overlaid with Resin-impregenated Paper, published at least by Apr. 3, 2019, 8 pgs.
Merriam-Webster—Definition of Lignocellulose, published at least by Apr. 3, 2019, 7 pgs.
ASTM—Standard Test Methods for Water Vapor Transmission of Materials, published at least by Apr. 3, 2019, 8 pgs.
"ZIP System R-6 Sheathing—Installation Manual", Huber Engineered Woods, HUB 3004, Dec. 12, 2011, 8 pages.
"ZIP System R-3 Sheathing—Installation Manual", Huber Engineered Woods, HUB 3003, Installation Manual, Dec. 12, 2011, 9 pages.
"ZIP System R Sheathing Insulated Wall Panel", Huber Engineered Woods, HUB 3011, 2011, 2 pages.
"ZIP System Sheathing Load-Span Tables", Huber Engineered Woods, Technical Tip, published at least by Aug. 26, 2019, 5 pages.
"ZIP System Sheathing and Covering Applications Technical Bulletin," Huber Engineered Woods, Technical Bulletin, published at least by Aug. 26, 2019, 1 page.
"Sheathing Products Comparison Chart," Atlas Roofing Corporation, published at least by Aug. 26, 2019, 1 page.
Thermo-ply Structural Sheathing; Product Brochure from website, http://oxengineeredproducts.com/wp-content/uploads/2014/11/TPly-Product-InfoWeb-10_29_14.pdf., published at least by Aug. 26, 2019, 4 pages.

STRUCTURAL INSULATED SHEATHING PANEL AND METHODS OF USE AND MANUFACTURE THEREOF

CROSS-REFERENCE TO RELATED APPLICATIONS

This application is a continuation-in-part of U.S. Non-Provisional patent application Ser. No. 16/794,568, filed Feb. 19, 2020; which is a continuation of U.S. Non-Provisional patent application Ser. No. 14/982,780, filed Dec. 29, 2015, now U.S. Pat. No. 10,570,616, issued Feb. 25, 2020; which is a divisional of U.S. Non-Provisional patent application Ser. No. 13/907,628, filed May 31, 2013, now U.S. Pat. No. 9,234,355, issued Jan. 12, 2016; which claims the benefit of priority to U.S. Provisional Application No. 61/654,064, filed on May 31, 2012, all of which are incorporated by reference herein in their entirety.

TECHNICAL FIELD

The present invention relates generally to sheathing systems for use in building construction to externally envelope a building structure, and particularly to such sheathing systems that provide vapor permeability and protect against bulk water, air, and heat transfer.

BACKGROUND

Wall and roof panel construction systems of residential or commercial buildings do not typically provide simple, efficient, and safe means of installation. Most often in these systems, extra steps must typically be added to the installation process to prevent liquid moisture, air, and heat from passing through the wall.

Constructing a wall with a weather barrier requires not only that panels be attached to framing members, but also a house wrap is unrolled and spread over the walls. The house wrap is attached to the sheathing panels with staples or button cap nails and fenestration openings for windows or doors must be cut out of the wrap and the flaps from these openings folded back and stapled down. The house wrap is often difficult to install because it is in typical nine-ft wide rolls, which can be cumbersome to maneuver by workers on scaffolding or in windy conditions. While it is important that the barrier layer shed bulk water, it should allow for the escape of water vapor. Moreover, since house wraps are only fastened at limited points, pockets or voids form between the sheathing and house wrap. If the barrier were to trap water vapor in a wall panel, the build-up of moisture could lead to rot or mold growth. Further, certain sheathing materials, such as oriented strand board (OSB), are known to irreversibly swell and warp when exposed to moisture.

Furthermore, small gaps along the edges of adjoining panels typically remain after installation assembly. These thermal gaps within the building envelope allow undesirable thermal energy entry and escape through the walls. Although house wrap can provide some protection, breaks or tears in the house wrap often form during installation or construction. Foam insulation sheathing has also been used to improve thermal resistance performance of building structures. However, insulation sheathing also presents certain limitations and challenges. In addition to frequently suffering physical damage during installation and construction, the structural properties of insulation sheathing relegates it to limited building applications. Insulation sheathing panels are typically fastened as exterior cladding to the outermost, exterior facing of the wall with nails, screws or staples. Once again, this is an extra step that must be added to the installation process. Moreover, as an additional fastened layer, pockets or voids inevitably form between it and the surface it is secured to. Moreover, most insulation sheathing can also limit external finishing options.

In addition to wall panel systems, roof panel construction systems of residential or commercial buildings do not typically provide simple, efficient, and safe means of installation. The roof of a residential or commercial building is typically constructed by attaching several roofing panels to the rafters of an underlying supporting structural frame; the panels are most often placed in a quilt-like pattern with the edge of each panel contacting the edges of adjacent panels so as to form a substantially continuous flat surface atop the structural frame.

However, problems with roofs constructed according to this method may present themselves. Like wall panels, small gaps along the edges of adjoining roofing panels remain after roof assembly. Because the roofing panels are typically installed days or even weeks before shingles are installed, it is important to have a panel system that minimizes leakage resulting from exposure to the elements until such time as the roof is completed. To prevent water from leaking through the gaps between panels, it is commonly known in the industry to put a water resistant barrier layer on top of the roofing panels (e.g., felt paper).

While it is important that the barrier layer shed bulk water, it should also allow for the escape of water vapor. If the barrier were to trap water vapor in a roofing panel, the build-up of moisture could lead to rot or mold growth that is undesirable. As mentioned previously, it is known in the art that substantial bulk water-impermeability of installed roofing panels is achieved by adding a layer of impermeable material, such as asphalt-impregnated roofing paper or felt over the external surface of the roof panels. However, while this provides additional protection against bulk water penetration, it has the disadvantage of being difficult and time-consuming to install because the paper or felt must be first unrolled and spread over the roof surface and then secured to those panels. Further, the use of a felt paper overlay often results in a slick or slippery surface, especially when wet. Additionally, when the felt paper is not securely fastened to the roof panels or becomes loose due to wind and other weather conditions or because of poor construction methods, the roof system can become very slippery and leak bulk water. Accordingly, a worker walking atop the felt paper must be careful to avoid slipping or sliding while thereon.

It is desirable for wall sheathing panels to shed precipitation, such as rain and snow, during construction so that the interior remains dry. Accordingly, there is a need in the art for wall-sheathing panels, which are resistant to bulk water but permeable to water vapor, provide improved thermal resistance and create a simplified, safe, and time-saving installation process.

Accordingly, there is also a need in the art for roofing panels, which can be conveniently fit together and yet are constructed to minimize the gaps or allow the gaps to be sealed between adjacent roofing panels to prevent or minimize the penetration of bulk water through the roof as it travels over the roofs surf ace. It is desirable for roofing panels to shed precipitation, such as rain and snow, during construction so that the interior remains dry.

Given the foregoing, there is a continuing need to develop improved panels for roof and wall construction that prevent or minimize the penetration of bulk water, that come preequipped with a water permeable barrier layer applied during manufacture, and that have improved thermal performance.

SUMMARY

In one aspect, the invention relates to a panel assembly for a sheathing system comprising structural panels, a mass-transfer barrier, an insulation layer, and seam sealant.

In another exemplary aspect, the invention relates to panel system to externally envelope a structure, the system comprising: a) at least two panel assemblies, each panel assembly having at least one edge and each panel assembly aligned with its at least one edge proximate to the at least one edge of at least one adjacent panel assembly to define a longitudinal seam between the two adjacent panel assemblies, each panel assembly including i) a structural panel with an outer surface and an opposite inner surface; ii) a barrier layer secured to the outward facing surface of each structural panel, the barrier layer being substantially bulk water resistant and substantially water vapor permeable; iii) an insulation layer secured to the inward facing surface of each structural panel; iv) a reinforcing layer secured to the insulation layer opposite the structural panel, the reinforcing layer being thinner than the structural panel; and b) a bulk water resistant edge sealant sealing the longitudinal seam between the two adjacent panel assemblies.

In another exemplary aspect, the invention relates to a method for externally sheathing and insulating a building structure, the method comprising the steps of: a) providing at least two panel assemblies, each panel assembly having at least one edge and each panel assembly aligned with its at least one edge proximate to the at least one edge of at least one adjacent panel assembly to define a longitudinal seam between the two adjacent panel assemblies, each panel assembly including: i) a structural panel including at least one lignocellulosic material, and each structural panel having an outward facing surface and an opposite inward facing surface; ii) a barrier layer secured to the outward facing surface of each structural panel, the barrier layer being substantially bulk water resistant and substantially water vapor permeable; iii) an insulation layer secured to the inward facing surface of each structural panel; and iii) a reinforcing layer secured to the insulation layer opposite the structural panel, the reinforcing layer being thinner than the structural panel; b) positioning each panel assembly such that the reinforcing layer faces inward towards the structure; c) fastening each panel assembly to the structure; and d) sealing the longitudinal seam between the two adjacent panel assemblies.

In further aspects, the invention also relates to systems using the disclosed insulated panels, which provide a barrier to bulk water, excess air and heat transfer, irritants, insects and mold that can be permeable to moisture movement, an inner insulating layer, and is suitable for use behind numerous exterior finishes, such as siding, EIFS, brick, stucco, lap siding, vinyl, and the like.

In still further aspects, the invention also relates to methods for installing the disclosed insulated panels.

In still further aspects, described herein are panels affixed with an outward facing barrier layer, and an inward facing insulation layer which are fastened to a building frame in a side-by-side manner, with or without a tongue and groove connection. Next, a sealant, such as tape, laminate, caulk, foam, spray, putty, mechanical fasteners, or any other suitable sealing mechanism, is used to seal the joints or seams between adjoining panels, thus completing the insulated, water barrier.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION

Figure 1:
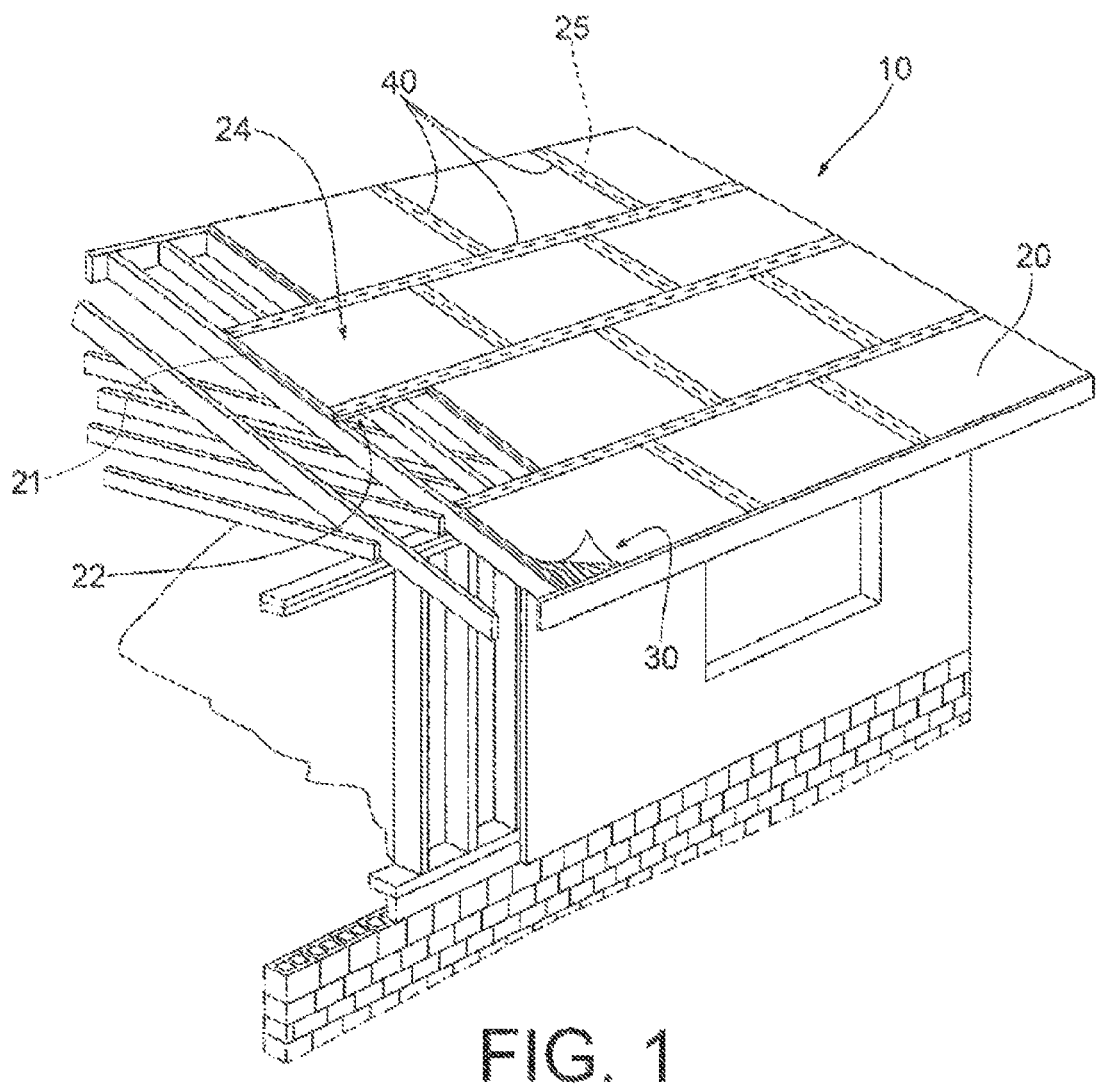
FIG. 1 is a perspective view of a portion of a building being constructed with a panelized roofing system utilizing a panel assembly according to an example embodiment.

Before the present compositions, articles, devices, and/or methods are disclosed and described, it is to be understood that the aspects described below are not limited to specific methods as such may, of course, vary. It is also to be understood that the terminology used herein is for the purpose of describing particular aspects only and is not intended to be limiting. As used in the specification and in the claims, the term "comprising" may include the embodiments "consisting of" and "consisting essentially of."

Disclosed are materials, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. Thus, if a class of adhesives A, B, and C are disclosed as well as a class of additives D, E, and F and an example of a combination A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, compositions, and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All parts, percentages and ratios used herein are expressed by weight unless otherwise specified.

In this specification and in the claims which follow, reference will be made to a number of terms which shall be defined herein.

As used in the specification and the appended claims, the singular forms "a," "an," and "the" include plural referents unless the context clearly dictates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "wood" is intended to mean a cellular structure, having cell walls composed of cellulose and hemicellulose fibers bonded together by lignin polymer. "Wafer board" is intended to mean panels manufactured from reconstituted wood wafers bonded with resins under heat and pressure.

As used herein, "wood composite" and "wood composite material" mean a composite material that comprises wood and one or more other additives, such as adhesives or waxes. Non-limiting examples of wood composite materials include oriented strand board ("OSB"), waferboard, particleboard, chipboard, medium-density fiberboard, plywood, and boards that are a composite of strands and ply veneers. As used herein, "flakes" and "strands" are considered equivalent to one another and are used interchangeably. A non-exclusive description of wood composite materials may be found in the Supplement Volume to the Kirk-Othmer Encyclopedia of Chemical Technology, pp. 765-810, $6^{th}$ edition.

As used herein, "structural panel" is intended to mean a panel product, commonly made of a wood composite material, which in its commodity end use, is essentially dependent upon certain mechanical and/or physical properties for successful end use performance, such as oriented strand board (OSB) and plywood. A non-exclusive description and definition may be found in the PS 1 and PS 2 Voluntary Product Standards for plywood, OSB, and waferboard. As used herein, "panel assembly" is intended to mean a structural panel (i.e., board or core) layer and one or more additional integral layers, though sometimes the term "panel" may be used to refer to the panel assembly, which in the context used is clear to persons of ordinary skill in the art.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

The following describes exemplary embodiments of the present invention which provides panels for a panelized sheathing system, attached to a frame structure, and that are suitable for use in the construction of residential and commercial buildings.

A. Use of Panel for Roof Sheathing

In one aspect, FIG. 1 illustrates a panelized roof sheathing construction system 10 for a building having a plurality of structural insulated panel assemblies 20 attached to a building frame structure in substantially abutting relationship. The panel assemblies 20 each include a structural panel or core layer 26 having an inward facing surface 22 and an outward facing surface 24. In a further aspect, the panel assemblies 20 each also include a water resistant barrier layer 30 adhesively secured to at least one of the surfaces 22, 24 of the panels 26, each barrier layer 30 providing a substantially skid-resistant and bulk water resistant surface. One example of a paper overlaid wood board is shown and described in U.S. Pat. No. 6,737,155 entitled "Paper Overlaid Wood Board and Method of Making the Same" which is incorporated herein by reference. In a still further aspect, the panel assemblies 20 each also include an insulation layer 21 adhesively secured to at least one of the surfaces 22, 24 of the panels 20, each insulation layer 21 providing increased structural and thermal performance. In a yet further aspect, the system 10 preferably includes a plurality of water-resistant sealants 40, each of the sealants 40 sealing at least one of the joints 25 between the adjacent panels 20.

Figure 2:
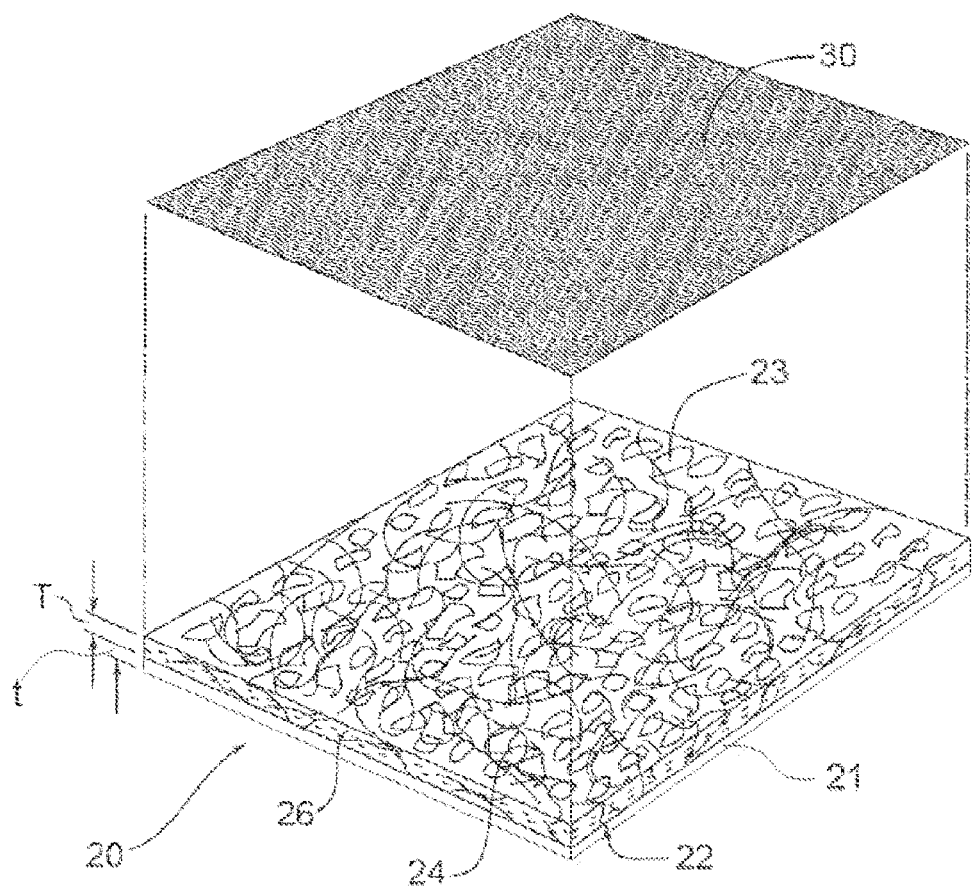
FIG. 2 is an exploded perspective view of the panel assembly of FIG. 1.

In various aspects, the structural panels 26 may be made from a variety of different materials, such as wood or wood composite materials. In one aspect, the panels 26, as shown in FIG. 2, are preferably comprised of an oriented strand-board ("OSB") substrate. In a further aspect, the OSB panels 26 are derived from a starting material that is naturally occurring hard or soft woods, singularly or mixed, whether such wood is dry (preferably having a moisture content of between 2 wt % and 12 wt %) or green (preferably having a moisture content of between 30 wt % and 200 wt %) or of moisture content in between dry and green (preferably having a moisture content of between 12 wt % and 30 wt %). Typically, the raw wood starting materials, either virgin or reclaimed, are cut into veneers, strands, wafers, flakes, or particles of desired size and shape, which are well known to one of ordinary skill in the art.

In a further aspect, each of the surface layers 22, 24 of the OSB panel 26 are preferably oriented in parallel with the long dimension of the panel assembly 20, and the OSB panel 26 preferably includes a plurality of substantially parallel strands 23 that are oriented perpendicular to the strands of the surface layers 22, 24. In a still further aspect, the panels 26 of the panelized roof system 10 may be selected from a number of suitable materials that provide adequate protection against the penetration of bulk water. Generally, the panels 26 of the are comprised of reconstituted lignocellulosic furnish. In a further aspect, the panels 20 are comprised of structural wood such as OSB or plywood. In a still further aspect, types of wood material used to manufacture the panels 20 may be, but are not limited to particle board, medium density fiber board, waferboard or the like.

The presently described panels 26, excluding any insulation layer 21, are preferably of a thickness T in a range from about 0.635 cm (0.25 inches) to about 3.175 cm (1.25 inches). In a further aspect, the panel assemblies 20 can also comprise a radiant barrier material (not shown) attached to the lower face of the panel, i.e., to a face of the insulation layer or the face of the panel facing inwardly, toward the interior of the building. In a yet further aspect, the radiant barrier material preferably includes a reflective surface that reflects infrared radiation that penetrates through the roof back into the atmosphere. The combination of this reflective function, as well as the foil's low emissivity, limits the heat transfer to the attic space formed in the interior of the building in the space under the roof. By limiting the heat transfer, the attic space temperature is reduced, which in turn reduces the cost of cooling the house.

In a further aspect, the radiant barrier material can simply be a single layer radiant barrier sheet, such as metal foil, for example, aluminum foil. In a still further aspect, the radiant barrier material can comprise a radiant barrier sheet adhered to a reinforcing backing layer made from a suitable backing material, such as polymeric film, corrugated paper board, fiber board, kraft paper, or a combination thereof. In a yet further aspect, the backing material makes the foil material easier and more convenient to handle. In an even further aspect, the multi-layered material can be a laminate in which a backing material is laminated to a radiant barrier sheet.

Methods of manufacturing a radiant barrier material are discussed in greater detail in U.S. Pat. No. 5,231,814, issued Aug. 3, 1993, to Hageman and U.S. Pat. No. 3,041,219, issued Jun. 26, 1962, to Steck et al. Other suitable radiant barrier material is manufactured under the name SUPER R™ by Innovative Insulation, Inc. of Arlington, Texas. These SUPER R™ products have two layers of aluminum foil each of which have an aluminum purity of 99%, and a reinforcing member located inside, between the two layers. In a further aspect, the reinforcing member can be a reinforcing scrim or a polymer fabric.

Both the radiant barrier material and the barrier layer can be applied to the panel 26 by, for example, spreading a coat of adhesive to the surface of the panel, applying the heat-reflecting material (or the barrier layer) over the adhesive onto the panel and pressing the radiant barrier material (or barrier layer) onto the panel. After the adhesive dries or cures, the panel assembly 20 is ready for use.

The radiant barrier can be a coating on either side of the panel 26, which could be used facing into or out from the attic. In a further aspect, the panel assemblies 20 can also provide protection against ultraviolet light per ASTM G53, G154, which does not delaminate, does not reduce slip resistance, and does not promote fading.

Figure 3:
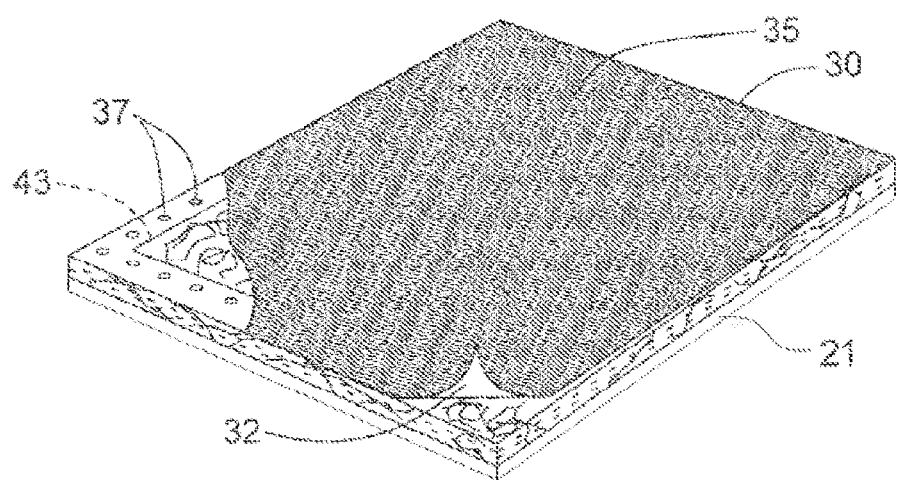
FIG. 3 shows the panel assembly of FIG. 2 in an assembled state with a portion of a barrier layer removed to expose underlying features.

In one embodiment, FIG. 3 shows a panel assembly 20 for the panelized roof or wall system 10 comprising a water-resistant barrier layer 30 secured to the outward facing surface 24 of panel 26, with each barrier layer 30 optionally providing a substantially skid-resistant surface 35, and an insulation layer 21 secured to the inward surface 22 of the panel 26.

The water-resistant barrier layers 30 can optionally be comprised of a resin-impregnated paper 32 having a paper basis weight of, for example, 21.772 kg (48 lbs.) to about 102.058 kg (225 lbs.) per ream or a dry weight of about 78.16 gm/m² (16 lbs./msf) to about 366.75 gm/m² (75 lbs./msf), and preferably substantially cover the outward facing surface 24 of the panels 20. In a further aspect, the paper 32 is preferably resin-impregnated with a resin such as, but not limited to a phenol-formaldehyde resin, a modified phenol-formaldehyde resin, or other suitable resin. In a yet further aspect, the paper has a resin content of about greater than 0% to about 80% by dry weight, most preferably from a range of about 20% to about 70% by dryweight. In a still further aspect, the resin-impregnated paper for the panel in a panelized roof or wall sheathing construction system of the present invention also preferably includes a glueline layer in a range from about 9.77 gm/m² (2 lbs./msf) to about 244.5 gm/m² (50 lbs./msf), and more preferably of a range from about 9.77 gm/m² (2 lbs./msf) to about 177.24 gm/m² (12 lbs./msf). In a yet further aspect, the glueline layer may be formed from a phenol-formaldehyde resin, and isocycanate, or the like.

The water-resistant barrier layer 30 can optionally comprise an applied coating layer. For example, one such coating is an experimental acrylic emulsion coating from Akzo-Nobel. In a further aspect, another suitable coating is Valspar's Black Board Coating. It is understood that by those skilled in the art that other classes of coatings may serve as an appropriate barrier layer. Thus, in various aspects, coatings may be used in combination with paper overlays to add desired functions to the panel.

According to various aspects, the water-resistant barrier layers 30 of the disclosed panels are generally resistant to bulk (liquid) water but permeable to water vapor. For example, the barrier layers can have a water vapor permeance in a range from about 0.1 U.S. perms to about 50.0 U.S. perms, including exemplary water vapor permeance of 0.1, 1, 2, 5, 7, 10, 15, 20, 25, 25, 30, 35, 40, 45, 50 U.S. perms. According to further aspects, the barrier layer can have any water vapor permeance value within any range derived from any of the above exemplified water vapor permeance values, including, for example, from about 0.1 to 20 perms.

Additionally, the water-resistant barrier layers 30 can have any desired water vapor transmission rate. For example, the barrier layers 30 can have a desired water vapor transmission rate from about 0.1 to about 25 g/m²/24 hrs (at 73° F.—50% RH according to ASTM E96 procedure A), including exemplary water vapor transmission rates of 0.1, 1, 2, 5, 7, 10, 15, 20, 25, 25 g/m²/24 hrs. According to further aspects, the barrier layer can have any water vapor transmission value within any range derived from any of the above exemplified water vapor transmission rates, including, for example, from about 0.7 to about 7 g/m²/24 hrs.

In a further aspect, the water-resistant barrier layers 30 can have a desired water vapor permeance from about 0.1 to about 50 U.S. perms (at 73° F.—50% RH via ASTM E96 procedure B), including exemplary water vapor permeance of 0.1, 1, 2, 5, 7, 10, 15, 20, 25, 25, 30, 35, 40, 45, 50 U.S. perms. According to further aspects, the barrier layer 30 can have any water vapor permeance value within any range derived from any of the above exemplified water vapor permeance values, including, for example, from about 0.1 to about 12 U.S. perms.

The water-resistant barrier layers 30 can also have a liquid water transmission rate from about 1 to about 28 grams/100 in²/24 hrs (via Cobb ring) according to ASTM D5795. This test method allows the quantification of liquid water that passes through the underlayment to the underlying substrate and can be easily done on specimens where the underlayment cannot be removed for visual inspection.

In various aspects, the panel assemblies 20 can further comprise a non-skid surface that has a coefficient of friction equal to or better than plywood or oriented strand board when dry and/or wet can be achieved in a primary process that is both quick and relatively inexpensive. In a further aspect, the water-resistant barrier layers 30 advantageously provide a textured surface 35 to the structural panel assemblies 20. In a still further aspect, the textured surface 35 is adapted to provide a wet coefficient of friction in a range of from about 0.8 to about 1.1 (English XL Tribometer) and a dry coefficient of friction in a range of from about 0.8 to about 1.1 (English XL Tribometer). Examples of methodology used to measure wet surfaces may be found at pg. 173 in "Pedestrian Slip Resistance; How to Measure It and How to Improve It." (ISBN 0-9653462-3-4, Second Edition by William English).

Figure 4:
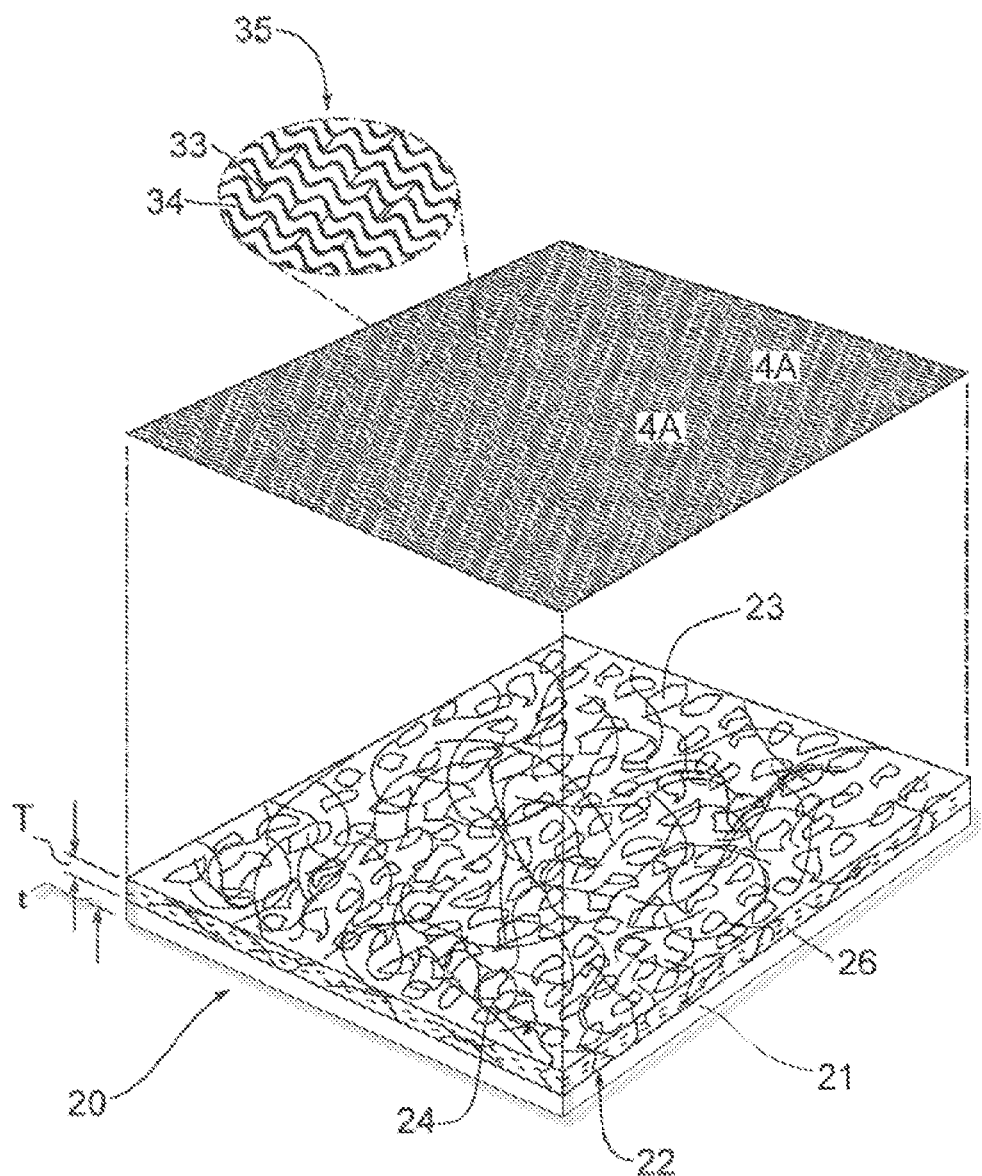
FIG. 4 is an exploded perspective view of a panel assembly according to an alternative embodiment, showing a detailed exploded view of the textured surface.
Figure 4A:
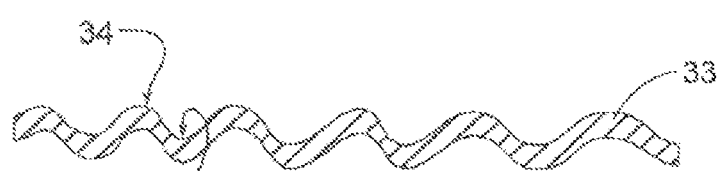
FIG. 4A is a cross-sectional view of the textured surface taken along the line 4A-4A of FIG. 4.

In one aspect, the textured surface 35 shown in FIG. 4A is characterized by an embossed pattern of features or indentations. As used herein, "embossing" can mean embossing, debossing, scoring, or any other means to alter the texture of the panel other than adding grit or the like to the surface.

The texture preferably has a number of features or elements disposed in a first direction and a number of features or elements disposed in a second direction. For example, in one aspect, a first group of elements can be disposed in a direction across the width of a panel and a second group of elements can be disposed in a direction along the length of a panel. In a further aspect, the elements or features disposed in first and second directions can be of similar or can be of different sizes. In a further aspect, the elements similarly may be of different or of similar shapes. In a still further aspect, non-limiting examples of similarly sized features include an embossed herringbone or an embossed basket weave configuration. In a yet further aspect, a herringbone pattern may be very tightly disposed or may be somewhat "spread-out" in such a manner so that major channels with minor indentations are created.

In a further aspect, the embossed textured surface is more preferably comprised of a plurality of major or primary textured features and a plurality of minor or secondary textured features. In a still further aspect, the minor or secondary textured features are at least partially disposed on one or more corresponding major feature. Thus, according to one embodiment, while the general appearance of the exemplary textured surface 35 appears to be a random pattern of raised areas, a closer examination of the exemplary textured surface reveals finer detail. In a further aspect, the exemplary textured surface 35 includes a plurality of major channels 33 that are disposed substantially parallel with a pair of opposing edges (preferably the shorter pair of opposing edges) of the panel. In a still further aspect, a plurality of minor indentations 34 are disposed within the major channels 33 and run generally orthogonally to the major channels. It should be appreciated that the exploded magnified view of FIG. 4, showing the minor indentations 34 and major channels 33 in detail, is illustrative and does not necessarily represent the preferred density of minor indentations or major channels.

In various aspects, the present invention provides for advantageous slip-resistance by providing any number of major channels. In a further aspect, the density of the major channels is about 5 to about 15 major channels per 2.54 cm (1 inch) as measured in a direction perpendicular to the direction of the major channels. In a still further aspect, the density of the major channels is about 9 to about 12 major channels per 2.54 cm (1 inch) as measured in a direction perpendicular to the direction of the major channels. On a typical 1.219 m×2.438 m (4'×8') sheathing panel, the major channels will preferably run generally across the 1.219 m (4') or short direction. It should be appreciated that it is not necessary nor required that the major channels be exactly parallel and may undulate slightly from side to side in a somewhat serpentine fashion rather than being straight.

In a further aspect, the minor indentations 34 according to the present invention may vary in length and width. In a further aspect, the minor indentations 34 preferably have an elongated shape that measures preferably from about 0.0508 cm (0.020 inches) to about 0.254 cm (0.100 inches) in length and from about 0.0254 cm (0.010 inches) to about 0.254 cm (0.100 inches) wide. In various aspects, the present invention provides for advantageous slip-resistance by providing any number of minor indentations. In a further aspect, the density of the minor indentations is about 15 to about 35 of the minor indentations per inch as measured along the direction of the major channels. In a still further aspect, the long direction of the minor indentations preferably extends generally across the eight-foot (or long) direction of a typical panel.

In a further aspect, the textured surface can also, alternatively, be created via a plurality of raised protrusions and grooves. In a still further aspect, the protrusions may have a height in a range of about 0 mils to about 25 mils, preferably from a range of about 3.0 to about 13.0 mils as measured by profilometry (Mitutoyo SJ201P).

In accordance with the exemplary configuration of the textured surface 35, in a typical roof sheathing application using 1.219 m×2.438 m (4'×8') panels where the 2.438 m (8') edge of the sheathing panel is parallel to the floor of the home, the major channels 33 will generally be oriented up and down, while the long direction of the minor indentations 34 will generally run across the roof. In a further aspect, the depth of the major channels and minor indentations have been found to be in a range of about 5 to about 13 mils as measured by the Mitutoyo Surface Profiler. It should be appreciated that at least some of the major channels and minor indentations may be of a depth greater or deeper than the thickness of the paper (i.e., some of the major channels and minor indentations may be of a depth that would project into the surface of the panel).

An anti-skid surface of the present system advantageously reduces the potential for a ladder leaning thereon to slip. A worker who is applying house wrap or taping house wrap is currently exposed to the risk of his ladder skidding against the slippery surface of house wrap. Current house wrap products create the opportunity for a worker to fall from a ladder that skids against house wrap. The surface of current house wrap products promotes the likelihood of "ladder slip." Workers have complained that ladders will slide unless they apply a skid resistant product to their ladders.

In one aspect, the barrier layers 30 shown in FIG. 3 can further include indicia 37 for positioning fasteners. U.S. Pat. No. 7,150,128 (entitled "Boards Comprising an Array of Marks to Facilitate Attachment"), U.S. Pat. No. 7,882,661, and U.S. Pat. Pub. 2011/0189447, incorporated herein by reference, provide additional detail regarding example fastener indicia 37. In a further aspect, the barrier layers are preferably adapted to receive fasteners in a substantially water-proof manner.

According to further aspects, and as depicted in FIG. 2 and FIG. 3, the panel assembly 20 for the panelized roof or wall system 10 can comprise an insulation layer 21 secured to the inward facing surface 22 of panel 26. In further exemplary aspects, the insulation layer 21 at least substantially covers the inward facing surface 22 of the panels 20.

The insulation layer 21 can comprise any suitable insulation material conventionally known to one of ordinary skill in the art. For example, the insulation layer 21 can comprise a foam polymer insulation, including for example and without limitation, polyisocyanurate foam, polystyrene foam, polyurethane foam, or any combination thereof. In further aspects, the foam insulation layer 21 comprises polyisocyanurate foam. In still further aspects, the foam insulation layer can comprise a blend or combination of a polyisocyanurate and polyurethane foam.

The foam insulation layer 21 can comprise extruded foam, expanded foam, or a combination thereof. As one of ordinary skill in the art will appreciate, extruded foams can be prepared by melting a suitable polymer material, incorporating a blowing agent to yield a foamed gel, and extruding the foamed gel through a die to form the desired foam layer 21. Expanded foams can be prepared by subsequent expansion of beads containing a blowing agent, wherein the expanded beads are molded at the time of expansion to form the desired foam layer.

The foam insulation layer 21 can have any desired density. For example, the foam insulation 21 can have a density of at least about 1, 2, 3, 4, 5, 6, 7, 8, 9, 10, 11, 12, 13, 14, 15, 16, 17, 18, 19, or 20 pounds per cubic feet (pcf) according to ASTM D1622. In further aspects, the foam insulation 21 can have a density in the range of about 1 pcf to about 20 pcf. In still further aspects, the foam insulation density can be any desired value within any range derived from any of the above exemplified values, including, for example, a density in the range from about 2 to about 5 pcf, or from about 1 to about 10 pcf.

The foam insulation 21 can be either closed cell or open cell. Open cell foam is more likely to let water vapor condense inside the cells, thereby reducing the insulation value. Thus, in further exemplary aspects, the foam insulation 21 is closed cell. In still further aspects, the foam insulation 21 is greater than about 50, 60, 70, 80, 90% closed-cell according to ASTM D2856.

Since in various aspects water can negatively impact thermal performance, the Insulation layer 21, according to exemplary aspects of the disclosure, exhibits limited or substantially no water absorption. For example, the foam insulation 21 exhibits a water absorption of less than about 10, 9, 8, 7, 6, 5, 4, 3, 2, or even less than 1% according to ASTM C209. In further aspects, the foam insulation 21 exhibits a water absorption of less than about 10, 9, 8, 7, 6, 5, 4, 3, 2, or even less than 1% according to ASTM C2842. In still further aspects, the foam insulation 21 can exhibit a water absorption in the range of about 10% to about 0%. In yet further aspects, the foam insulation 21 has a water absorption that can be any desired value within any range derived from any of the above exemplified values, including, for example, a water absorption in the range from about O to about 5%, or from about 1 to about 3.5%.

Moreover, the insulation layer 21 can have any desired water vapor permeance (or transmission). For example, the water vapor permeance of the insulation layer 21 can be less than about 20, 15, 10, 9, 8, 7, 6, 5, 4, 3, 2, 1, 0.5, or even less than 0.1 perms according to ASTM E96. In further aspects, the water vapor permeance of the insulation layer 21 can be in the range of about 0.1 to about 20 perms. In still further aspects, the water vapor permeance of the insulation layer 21 can be any desired value within any range derived from any of the above exemplified values, including, for example, a water vapor permeance in the range from about O to about 2 perms, or from about 1 to about 5 perms.

The insulation layer 21 can have any desired thickness (t). This thickness (t) can be customized to fit any particular application and desired thermal resistance. For example, and without limitation, the thickness (t) of the foam insulation layer 21 can be in the range of from about 0.25 in. (¼") to about 3 in. In further aspects, the thickness (t) can be from about 0.5 in. to about 1 in. Depending on the intended application, the panel assembly 20, including the insulation layer 21, can have any desired thermal resistance value (R-value). For example, the panel assembly 20 can have an R-value of at least about 1, 2, 3, 4, 5, 6, 7, 8, 9, 10, 15, 20, or even 25 according to ASTM C1289-02. In a further aspect, the R-value can be in the range of about 1 to about 25. In still further aspects, the R-value can be any desired value within any range derived from any of the above exemplified values, including, for example, R-value in the range from about 1 to about 10, or from about 3 to about 7.

In various aspects, the insulation layer 21 can optionally comprise a membrane layer (not shown). The insulation membrane layer can comprise radiant barrier material, such as metal foil, for example, aluminum foil, polymeric film or fabric, paper or cellulosic material, reinforcing scrim, such as fiberglass scrim, or a combination thereof. In some aspects, the membrane layer comprises a single or multi-layered material which can be a laminate in which a backing material is laminated to the foam insulation layer 21. In other aspects, one or more optional additives can also be incorporated into or otherwise applied to the foam insulation layer 21. Exemplary and non-limiting additives can include flame retardants, colorants, ultraviolet absorbers, textured coatings, and the like as well as any combinations thereof.

The insulation layer 21 can be secured to the inward facing surface 22 of the panel 26, for example, by any conventionally used adhesive material known in the art to be compatible for use with foam insulation. For example, according to non-limiting aspects of the invention, the adhesive can be selected from a phenol-formaldehyde resin, hot-melt adhesive, polyvinylacetate (PVA) resin, or any combination thereof. In still further aspects, the adhesive can be isocyanate-based.

The insulated panel assemblies 20 disclosed herein can exhibit improved physical strength and durability over conventional sheathing panels without a foam insulation layer. Thus, in one aspect, the insulated panels 20 can exhibit enhanced structural strength and dimensional stability when compared to a conventional sheathing panel (without an insulation layer) when exposed to substantially the same environmental and/or physical forces under substantially similar conditions. To that end, the foam insulation layer 21 can have a dimensional stability of about less than 5, 4, 3, 2, or even less than 1% according to ASTM D2126. In a further aspect, the dimensional stability is preferably about less than 2%. The foam insulation layer 21 can also have any desired compressive strength. For example, the foam insulation layer 21 can have a desired compressive strength of at least about 1, 5, 10, 15, 20, 25, 30, 35, or even at least about 40 pounds per square inch (psi) according to ASTM D1621. Ina further aspect, the compressive strength can be in the range of about 1 to about 40 psi. In a still further aspect, the compressive strength can be any desired value within any range derived from any of the above exemplified values, including, for example, a compressive strength in the range from about 15 to about 30 psi, or from about 20 to about 25 psi. Likewise, the foam insulation layer 21 can have any desired tensile strength. For example, the foam insulation layer 21 can have a tensile strength of greater than about 300, 400, 500, 600, 700, 800, 900, 1000, 1500, or even greater than about 2000 pounds per cubic foot (pcf) according to ASTM D1623. In further aspects, the tensile strength can be in the range of about 300 to about 2000 pcf. In still further aspects, the tensile strength can be any desired value within any range derived from any of the above exemplified values, including, for example, a tensile strength in the range from about 500 to about 1000 pcf, or from about 600 to about 800 pcf.

As previously discussed, moisture can be present in a wall or roof system as liquid (bulk) water or water vapor. Water vapor, if allowed to pass into or onto a foam insulation layer, can condense into bulk water either within the insulation, negating the overall thermal performance of the insulation, or between the foam insulation and adjacent layer, supporting mold and fungus growth. In various aspects, the inventive insulated panels 20 provide a structural wall and roof system that can exhibit improved durability and maintenance of thermal performance over traditional sheathing panels or foam panels. Thus, the design of the inventive insulated panels 20 can allow greater long-term performance and retention of R-values when compared to a conventional or reference foam panel when exposed to substantially the same environmental and/or physical forces under substantially similar conditions.

As briefly described herein, conventional external foam sheathing can have significant disadvantages as it can easily become damaged during the construction process. Furthermore, when exposed to physical and environmental elements, thermal resistance performance can quickly deteriorate. Moreover, foam sheathing can limit exterior surface finishing options. In various aspects, the design of the present wall and roof panels 21 can further provide structure and durability, while enhancing thermal performance and eliminating thermal bridging.

In an exemplary embodiment of the invention, the installation configuration of the system 10 is shown in FIG. 1. In one aspect, the panel assemblies 20 are attached to the rafters of an underlying supporting structural frame. In a further aspect, the attachment pattern may be edge to edge, tongue-and-groove or any other appropriate construction alignment. In a yet further aspect, the panels 20 are secured to the structural frame, with the foam insulation layer 21 facing inwardly, toward the interior of the building. Thus, the panel 20 includes a structural panel 26 that provides a nailable wood substrate, while also including an insulation layer 21 for providing the increased thermal performance of a foam sheathing. In a yet further aspect, the wood substrate panel 26 provides improved external security and durability over conventional foam sheathing. In an even further aspect, the improved external durability improves long-term thermal and structural performance.

Figure 5:
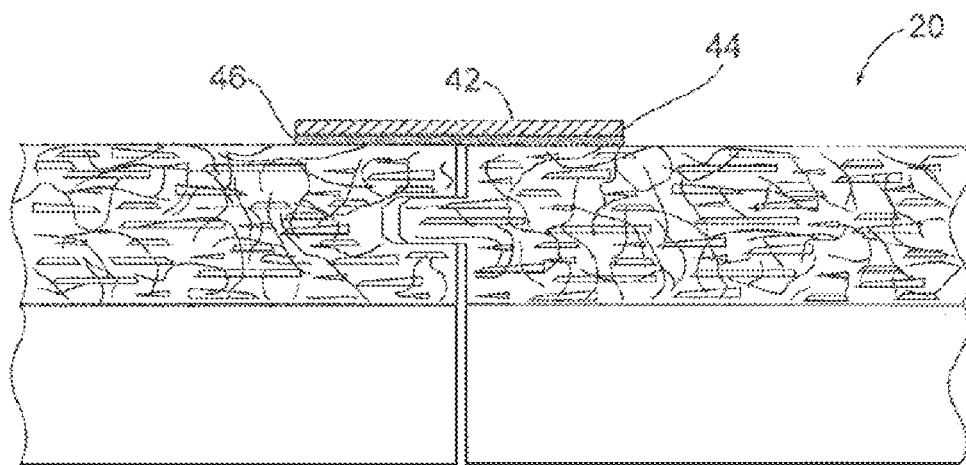
FIG. 5 is a partial cross-sectional view of two adjacent panel assemblies according to another example embodiment.

In another exemplary embodiment, FIG. 5 illustrates the cross-sectional profile of the panel 20 for a panelized roof or wall sheathing construction system 10. When attached to a building frame, joints or seams 25 form between the panels 20. In a further aspect, shown is a water-resistant sealant comprised of strips of water-resistant tape 42 with backing 44 and an adhesive layer 46. In a still further aspect, each of the strips of tape 42 can be applied, for example, by a hand held tape applicator to at least one seam/joint between adjacent panels 20 to form a substantially moisture-resistant seam with roofing accessory materials such as skylights, ventilation ducts, pipe boots, felt, flashing metals, roofing tapes, and various building substrates. In a yet further aspect, the tape 42 may have no backing or a backing 44 with a thickness of about ½ to about 1/30 the thickness of the adhesive layer 46. In an even further aspect, the strips of tape 42 may have a backing of a thickness of about 1.0 mils to about 4.0 mils and an adhesive layer disposed on the backing of a thickness of about 2.0 mils to about 30.0 mils. The dry coefficient of friction for the tape is preferably of at least about 0.6. In a further aspect, the panels 20, as shown in FIG. 3, can comprise alignment guides 43 on the panel for applying the tape strips 42 to facilitate installation. In a yet further aspect, the alignment guides 43 are placed approximately a distance of about ½ the width of the tape from the panel edge. In a preferred aspect, the tape strips 42 are installed by means of a handheld tape applicator.

Figure 6:
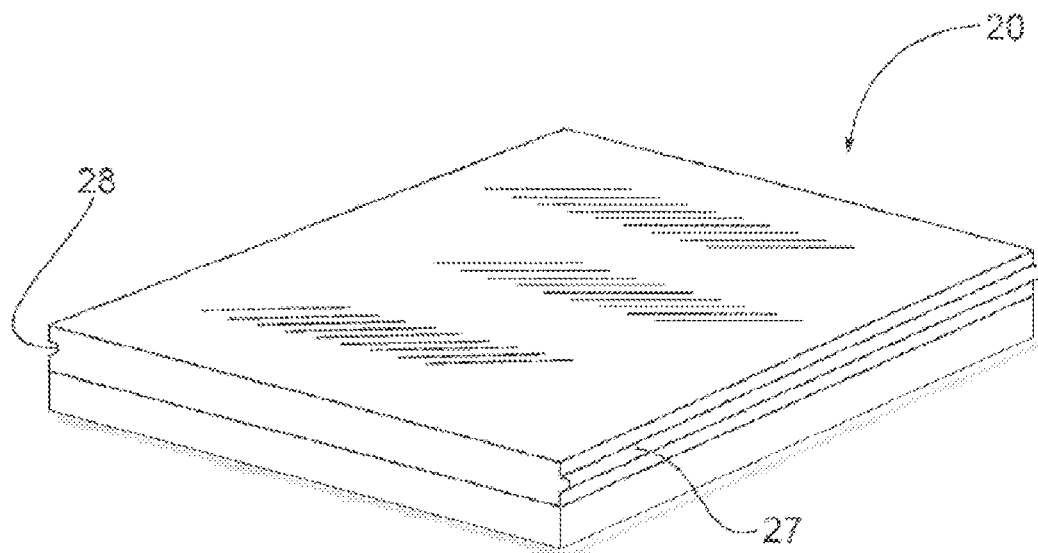
FIG. 6 is a perspective view of a panel assembly according to another example embodiment.

The panels 20 of the panelized sheathing construction system 10 typically have a first edge which is parallel with a corresponding second edge of a panel 20, and in some embodiments the panels 20 are linked together via one of a tongue 27 and groove 28 configuration (FIG. 5), an H-clip configuration, or a mating square edge configuration, as would be understood by one skilled in the art. In a further aspect, each of the first and second edges of the panel 20, as seen in FIG. 6, preferably have contiguous sections of equal length, with each section potentially including a groove 28 and a tongue 27 compatible with a corresponding groove 28 and tongue 27 of an adjacent panel 20. An example of one such tongue and groove panel is shown and described in U.S. Pat. No. 6,772,569 entitled "Tongue and Groove Panel" which is incorporated herein by reference.

Another such example is shown and described in U.S. Pat. Pubs. 2004/0105950A1 and 2005/0246998 entitled "Composite Wood Board having an Alternating Tongue and Groove Arrangement along a Pair of Edges," which are incorporated herein by reference. In a further aspect, the length of the first edge of each panel 20 is preferably a multiple of the length of a section, with the multiple being at least two. In a still further aspect, the length of the tongue 27 in each section measured in the longitudinal direction of an edge is preferably less than or equal to the length of the grooves 28, or the longest groove 28 in each section.

Figure 11:
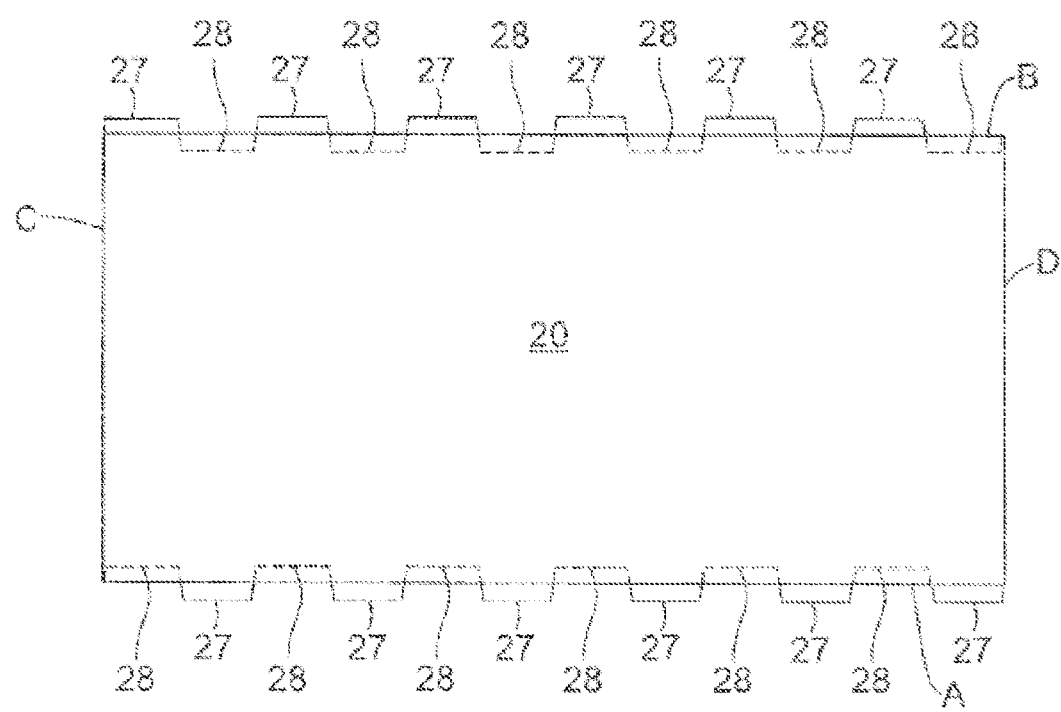
FIG. 11 is a plan view of a panel assembly according to another example embodiment.

Referring to FIG. 11, the panel 20, in one aspect, can have a first edge A, a second edge B, a third edge C and a fourth edge D. Edges A and B can be parallel. Edges C and D can be parallel and substantially perpendicular to edges A and B. In a further aspect, each of the edges A and B of panel 20 can include an alternating tongue and groove arrangement. In a further aspect, edge A includes perpendicularly extending tongues 27 and grooves 28. In a yet further aspect, edge B is similarly constructed, and includes tongues 27 and grooves 28. In an even further aspect, edge C is in contact with tongue 27 of edge B and groove 28 of edge A. In a still further aspect, edge D is in contact with groove 28 of edge B and tongue 27 of edge A. Thus, in various aspects, the tongues and grooves of panel 20 are directly opposite each other.

Figure 12A:
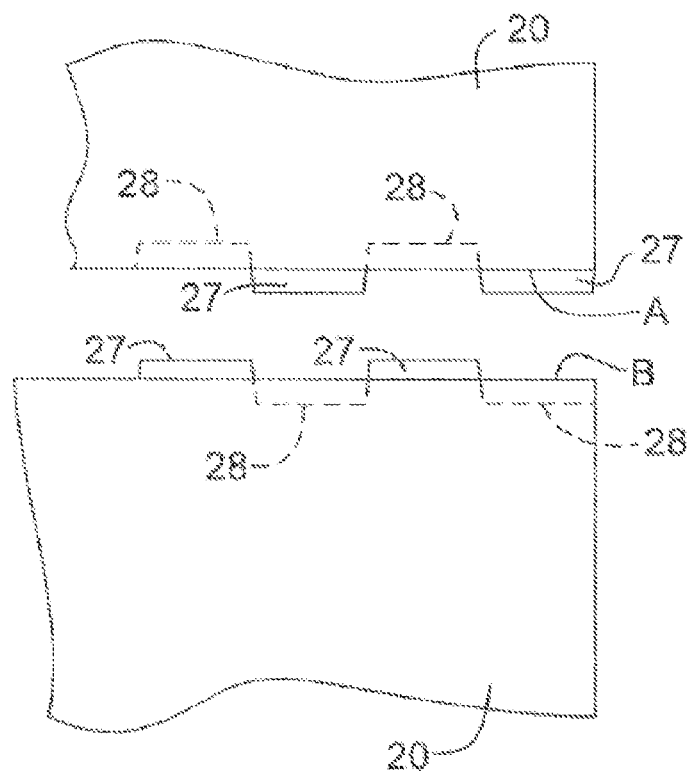
FIG. 12A is a partial plan view of a pair of panel assemblies according to another example embodiment, aligned for engagement.
Figure 12B:
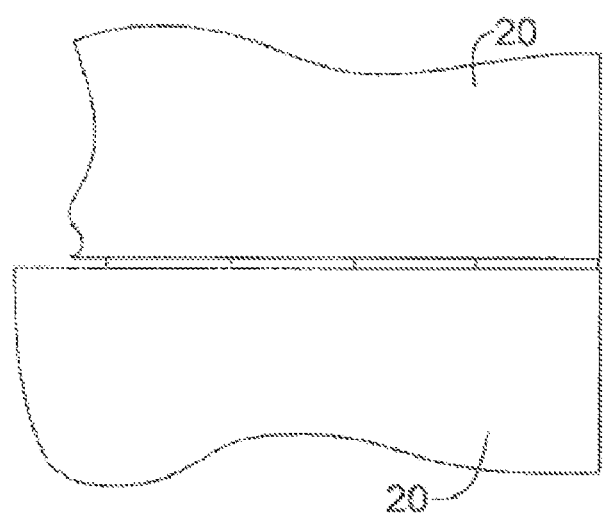
FIG. 12B shows the panel assemblies of FIG. 12A engaged together.

The tongues 27 and grooves 28 along edge A of panel 20 can be brought into engagement with the grooves 28 and tongues 27 of edge B of adjacent panel 20 (FIGS. 12A and 12B). Thus, if one of the panels 20 is rotated one hundred and eighty degrees, the tongues 27 and grooves 28 along abutting edges can be brought into engagement.

Figure 10:
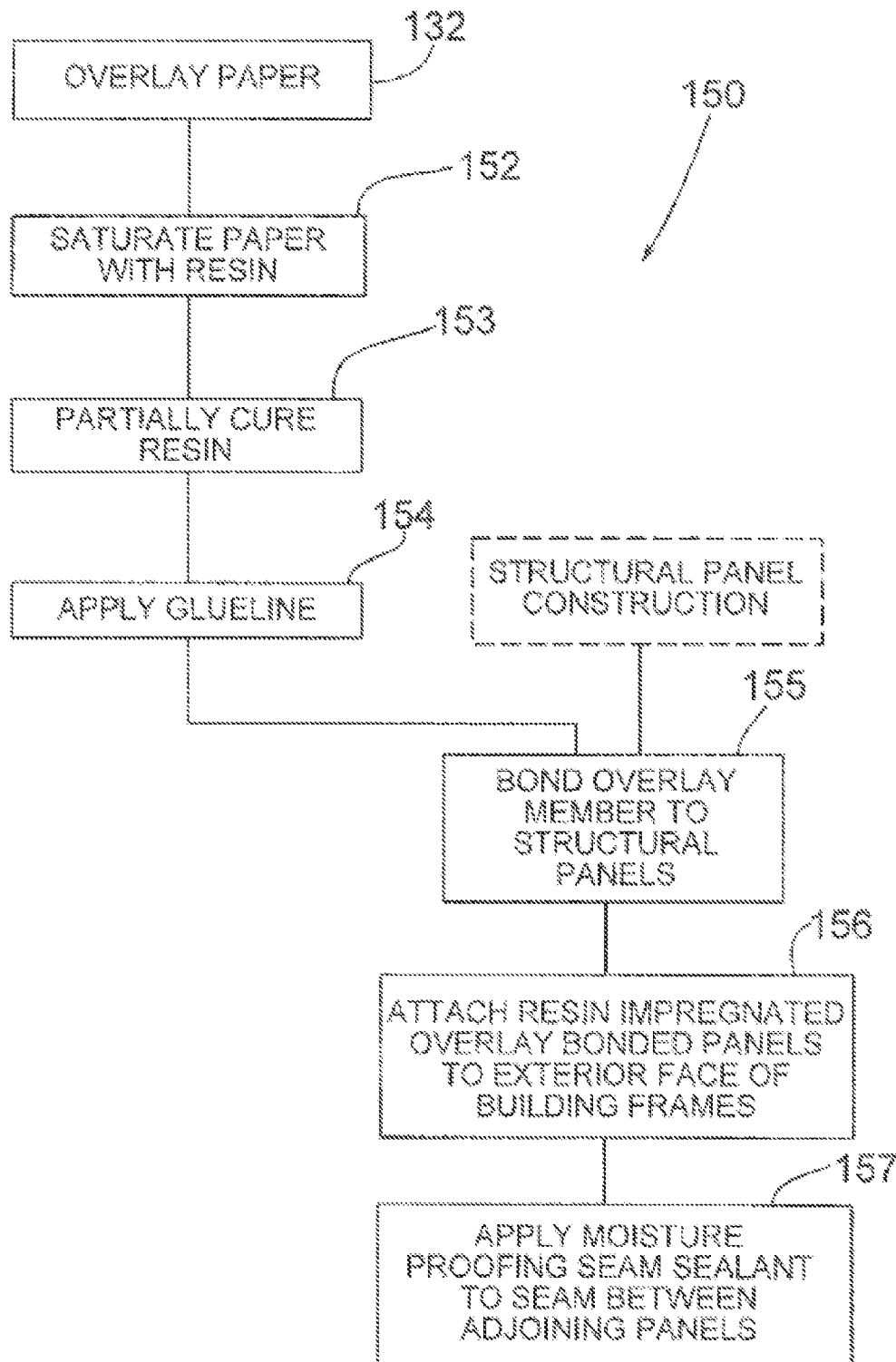
FIG. 10 is a flow diagram of the steps included in the manufacture of a panel assembly for roof or wall sheathing systems according to example embodiments.

In various aspects, a method for producing water-resistant building panels of the present invention comprises the steps of providing a roll of dry paper, feeding a leading edge of a sheet of paper from said roll of dry paper onto a forming belt, and depositing reconstituted lignocellulosic furnish with an applied binding agent atop the dry paper sheet so as to form a lignocellulosic mat having first and second lateral edges (FIG. 10). In a further aspect, the flake mat and the dry paper sheet are cut into a segment of a predetermined length. In a still further aspect, the top surface of the flake mat is compressed and the first and second lateral edges of the flake mat are packed prior to the cutting step. In a yet further aspect, the segments are transferred onto a loading screen and then into a hot press. In an even further aspect, sufficient heat and pressure are provided in order to set the panel structure and to form a skid-resistant surface resulting from the screen imprint on said paper. In a still further aspect, the segments are cut into panels of predetermined sizes. In a yet further aspect, the paper sheet is preferably wet prior to transferring the segment onto the loading screen. In an even further aspect, indicia 37 for positioning fasteners or sealant alignment guides 43 are preferably marked onto the panel.

As a person becomes accustomed to walking on sloped surfaces such as roof systems, a small change in the coefficient of friction can cause someone to easily lose his or her footing. This aspect is illustrated in Table 1, which shows the coefficient of friction of plywood, OSB, those panels with securely fastened roofing felt and OSB and plywood with loose felt paper applied. The significant differences seen in the coefficient of friction of systems between felt paper being securely fastened and loose, is more than enough to cause a slipping hazard. In various aspects, the present system 10 has an advantage over felt paper in that the coefficient of friction does not change since the barrier layer 30 is secured to the panel 20 prior to installation, thus, virtually eliminating the occurrence of paper coming loose in the field.

TABLE 1

ANOVA table showing the differences in the coefficient of friction between common roofing panels of plywood and OSB and the use of felt that is securely fastened or loose on these panels. The coefficient of friction of the panel of a preferred embodiment is also shown for reference.
Analysis of Variance for CoF

| Source | DF | SS | MS | F | P |
|---|---|---|---|---|---|
| Product | 5 | 2.47230 | 0.49446 | 151.42 | 0.000 |
| Error | 66 | 0.21552 | 0.00327 | | |
| Total | 71 | 2.68782 | | | |

| Level | N | Mean | StDev | Individual 95% CIs For Mean Based on Pooled StDev |
|---|---|---|---|---|
| Embodiment 1 | 12 | 0.9043 | 0.0516 | (-*-) |
| Felt | 12 | 0.9973 | 0.0233 | (-*--) |
| Loose felt[1] | 12 | 0.5136 | 0.0323 | (-*-) |
| Loose felt[2] | 12 | 0.5646 | 0.0432 | (--*-) |
| OSB | 12 | 0.7381 | 0.0771 | (-*-) |
| plywood | 12 | 0.9360 | 0.0868 | (-*--) |

Pooled StDev = 0.0571       0.60   0.75   0.90

[1] Loose felt over OSB substrate.
[2] Loose felt over plywood substrate.

In many aspects, it is important that the panels used in roof applications are not slippery in service. It has also been observed that the coefficient of friction can vary among roof sheathing products of similar types from different sources. Further, the coefficient of friction of panels from one manufacturer can change dramatically, such as when the panels get wet from a change in weather conditions or morning dew. Further, the change in coefficient of friction can be inconsistent among manufacturers. This may be the result of process conditions, wood species, and raw materials used to manufacture these products. Sanding does not improve friction for sheathing panels even though it removes a top layer of wood that may be partially degraded by the process conditions, but it does promote adhesion for secondary lamination. Flat laminated products are perceived to be more slippery than textured products, and water on many substrates makes them slippery when wet. An anti-skid coating can be added to improve the coefficient of friction, but these coatings add additional manufacturing steps, equipment, and cost. Indeed, when plywood or OSB panels are overlaid with paper to create a smooth surface, the coefficient of friction drops compared to regular plywood and OSB. Adding texture to the surface of OSB has been suggested as a method of improving friction or skid-resistance of these panels, but testing of OSB sheathing using the English XL Tribometer indicated that the coefficient of friction of the smooth and textured sides of OSB were very similar under dry conditions and that the texture could decrease the coefficient of friction in the wet condition, which is shown in Table 2.

TABLE 2

ANOVA table showing the differences in the slip angle between the textured and smooth sides of OSB in the dry and wet condition and plywood in the wet and dry condition. The coefficient of friction is related to slip angle by CoF = Tan (slip angle), where the slip angle is expressed in radians.

| Source | DF | SS | MS | F | P |
|---|---|---|---|---|---|
| Factor | 5 | 232.33 | 46.47 | 12.46 | 0.000 |
| Error | 90 | 335.63 | 3.73 | | |
| Total | 95 | 567.96 | | | |

| Level | N | Mean | StDev | Individual 95% CIs For Mean Based on Pooled StDev |
|---|---|---|---|---|
| dry-plywood | 16 | 42.000 | 0.177 | (----*----) |
| dry-Textured | 16 | 41.500 | 0.530 | (----*---) |
| dry-Smooth | 16 | 42.063 | 0.442 | (---*----) |
| wet-plywood | 16 | 40.000 | 1.237 | (----*----) |
| wet-Textured | 16 | 37.625 | 0.530 | (----*----) |
| wet-Smooth | 16 | 39.938 | 1.326 | (----*---) |

Pooled StDev = 0.824       38.0   40.0   42.0

Thus, in various aspects, another notable advantage of the panelized roofing system 10 is retained skid resistance when wet. When texture is added to the surface of an overlaid wood composite panel 20, the coefficient of friction is unexpectedly increased above that of standard plywood and OSB.

Further exemplary aspects of the present invention are illustrated in Tables 3 & 4 and Plots 2 & 3, which show the coefficient of friction of the screen imprinted overlaid panel 20 vs. conventional smooth overlaid panels, oriented strand board with a screen imprint, oriented strand board that has been sanded and plywood in dry and wet conditions. Paper basis weights (per ream) of 31.751 kg (70 lbs.), 44.906 kg (99 lbs.) and 59.874 kg (132 lbs.) were also tested and compared to show that the range of paperweights mentioned in the embodiment of this record of invention will satisfy the coefficient of friction requirements.

From testing conducted using the English XL Tribometer, the coefficient of friction, as can be seen from Table 3, is significantly higher when a screen imprint is embossed on the surface of the panels 20 as compared to the smooth surface of conventional paper-overlaid panels. From Table 4, it can be seen that the coefficient of friction of the overlaid panels with the textured surface does not significantly decrease when wet and is much better than the coefficient of friction of plywood when wet.

In one example of the present invention, a roll of kraft paper of 44.9 kg (99 lb.) basis weight (per ream), saturated to about 28% by weight resin content with a glueline of phenolic glue of about 4.536 kg/304.8 m$^2$ (10-lbs/1000 ft$^2$) applied to one side of the paper was mounted onto a paper feeding apparatus so that the paper could be fed onto the forming line of an oriented strand board.

The paper was then fed onto the forming line belt with the glue line side of the paper facing up away from the belt. To prevent wrinkling or tearing of the paper, the paper roll must be un-wound at a speed that is consistent with the speed of the forming line. To maintain complete coverage of the paper overlay 30 onto the wood composite substrate 26, the paper is aligned with the forming line belt as it carries the mat toward the press.

Once the paper is fed onto the forming line, a wood mat is formed on top of the paper as it moves toward the press. The wood mat is formed with the first and second layers being the surface layers composed of strands oriented in a direction parallel to the long dimension of the panels and a third core layer composed of strands oriented in a direction perpendicular to the first and second layers.

TABLE 3

ANOVA table showing the differences in the coefficient of friction between paper overlaid panels with a smooth surface and with a textured imprint as well as oriented strand board with a textured imprint, oriented strand board sanded and plywood in the dry condition. "Level" is expressed as paper basis weight (in lbs.) per ream for overlay panels.

Analysis of Variance for CoF Dry

| Source | DF | SS | MS | F | P |
|---|---|---|---|---|---|
| Product | 8 | 0.90809 | 0.11351 | 16.4 | 0.000 |
| Error | 177 | 1.22522 | 0.00692 | | |
| Total | 185 | 2.13331 | | | |

| Level | N | Mean | StDev | Individual 95% CIs For Mean Based on Pooled StDev |
|---|---|---|---|---|
| 132 lbs. Paper Smooth | 23 | 0.9125 | 0.1045 | (---*---) |
| 132 lbs. Paper Textured | 20 | 1.0614 | 0.0269 | (----*---) |
| 70 lbs. Paper Textured | 20 | 0.9882 | 0.0422 | (----*---) |
| 70 lbs. Paper Smooth | 20 | 0.9106 | 0.1148 | (----*---) |
| 99 lbs. Paper Textured | 20 | 1.0533 | 0.0319 | (----*---) |
| 99 lbs. Paper Smooth | 24 | 0.9343 | 0.1079 | (---*---) |
| OSB Sanded | 26 | 0.8391 | 0.1103 | (---*---) |
| OSB Textured | 17 | 0.9801 | 0.0428 | (----*---) |
| Plywood | 16 | 0.9864 | 0.0666 | (----*----) |
| Pooled StDev = | 0.0832 | | | 0.880  0.960  1.040 |

TABLE 4

ANOVA table showing the differences in the coefficient of friction between paper overlaid wood composite panels with smooth and textured surfaces and plywood in the wet condition. "Level" is expressed as paper basis weight per ream for overlay panels. CoF = Coefficient of friction.
Analysis of Variance for CoF Wet

| Source | DF | SS | MS | F | P |
|---|---|---|---|---|---|
| Product | 6 | 1.59735 | 0.26623 | 207.03 | 0.000 |
| Error | 136 | 0.17489 | 0.00129 | | |
| Total | 142 | 1.77224 | | | |

| Level | N | Mean | StDev | Individual 95% CIs For Mean Based on Pooled StDev |
|---|---|---|---|---|
| 132 lbs. Paper Smooth | 23 | 0.8180 | 0.0373 | (-*-) |
| 132 lbs. Paper Textured | 20 | 1.0410 | 0.0294 | (-*-) |
| 70 lbs. Paper Textured | 20 | 1.0125 | 0.0286 | (-*-) |
| 70 lbs. Paper Smooth | 20 | 0.8003 | 0.0426 | (-*-) |
| 99 lbs. Paper Textured | 20 | 1.0386 | 0.0284 | (-*-) |
| 99 lbs. Paper Smooth | 24 | 0.8039 | 0.0432 | (*-) |
| Plywood | 16 | 0.8882 | 0.0362 | (-*-) |
| Pooled StDev = | 0.0359 | | | 0.800   0.880   0.960   1.040 |

Figure 13:
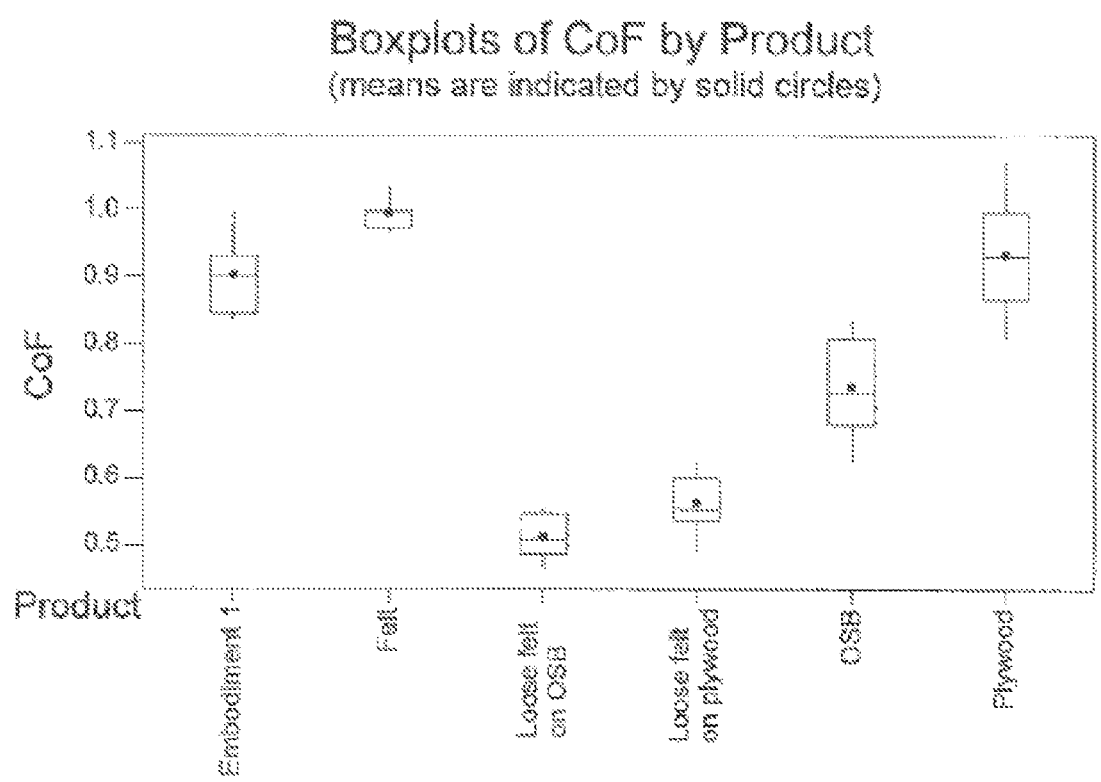
FIG. 13 shows a diagram of box plots showing the differences in the coefficient of friction between paper overlaid wood composite panels with smooth and textured surfaces, oriented strand board with a textured surface, oriented strand board with a sanded surface and plywood in the dry condition, according to example embodiments.

FIG. 13 illustrates box plots showing the differences in the coefficient of friction between paper overlaid wood composite panels with smooth and textured surfaces, oriented strand board with a textured surface, oriented strand board with a sanded surface and plywood in the dry condition. "Level" is expressed as paper basis weight per ream for overlay panels. CoF=Coefficient of friction.

Figure 14:
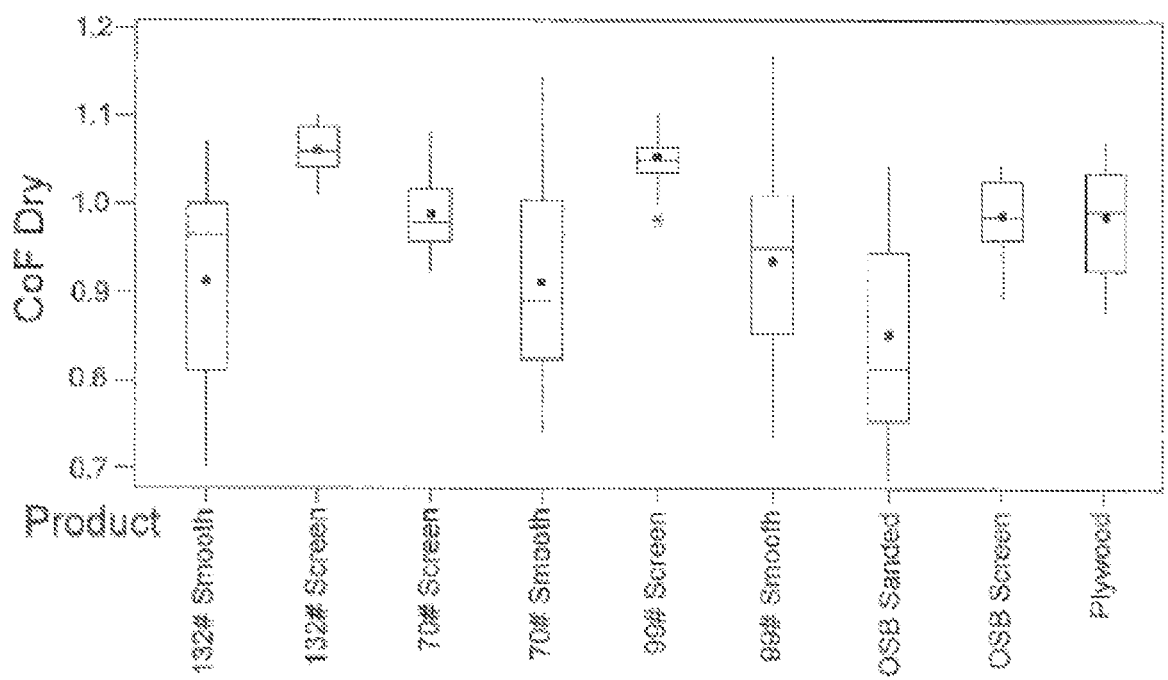
FIG. 14 shows a diagram of box plots showing the differences in the coefficient of friction between paper overlaid wood composite panels with smooth and textured surfaces, oriented strand board with a textured surface, oriented strand board with a sanded surface and plywood in the dry condition, according to example embodiments.

FIG. 14 illustrates box plots showing the differences in the coefficient of friction between paper overlaid wood composite panels with smooth and textured surfaces, oriented strand board with a textured surface, oriented strand board with a sanded surface and plywood in the dry condition. "Level" is expressed as paper basis weight per ream for overlay panels. CoF=Coefficient of friction.

Figure 15:
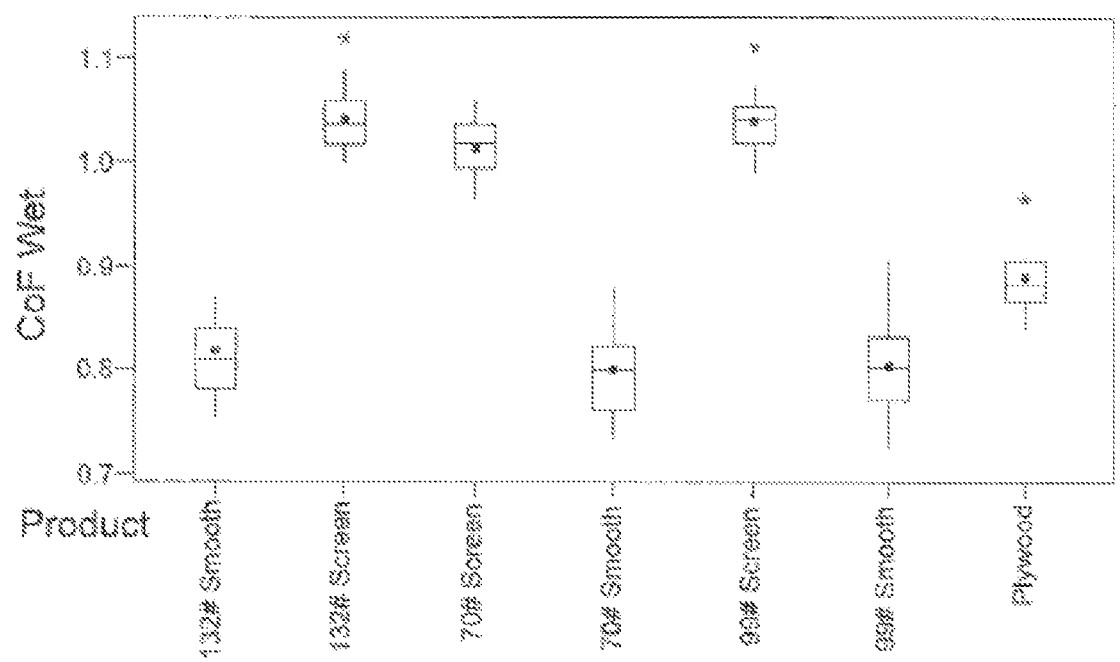
FIG. 15 shows a diagram of box plots showing the differences in the coefficient of friction between paper overlaid wood composite panels with a smooth and textured surface and plywood in the wet condition, according to example embodiments.

FIG. 15 illustrates box plots showing the differences in the coefficient of friction between paper overlaid wood composite panels with a smooth and textured surface and plywood in the wet condition. "Level" is expressed as paper basis weight per ream for overlay panels. CoF=Coefficient of friction.

During this process, flakes can be pushed underneath the paper overlay and can be pressed on to the surface of the panel, giving the panel a low quality look and hindering the performance of the final product. Therefore, air wands are used at the nose of the forming line to remove the excessive flakes between the paper overlay and the forming line belt.

The mat is then cut into a predetermined size for placing into press. The cut mats are then moved over the nose on the forming line (where the flakes are removed from the paper's surface using the air wands) and picked up by a screen embossed transfer mat. If appropriate, in the production of oriented strand board, the screen embossed transfer mat is sprayed with a release agent to keep the flakes from sticking to the press. However, given that there is a kraft paper overlay between the flakes and the mat, the release agent is not needed. To prevent the wood mat from slipping off the transfer mat during acceleration, water is sprayed on the surface of the transfer mat prior to the transfer mat picking up the wood mat.

The screen embossed transfer mat and wood mat are then placed in a hot press at a temperature preferably greater than 360° F. for a period long enough to cure the binders on the wood flakes.

The transfer mat then moves the pressed master mat out of the press, removing the screen embossed transfer mat from the wood master mat, leaving an embossed pattern on the surface of the paper overlay. The embossed pattern has hills and valleys with a distance between the valleys and hills of preferably about 0.03048 cm (1/1000 inch) to about 0.3048 cm (10/1000 inch). The pattern is enough to provide needed skid resistance without puncturing the paper overlay, compromising the water-resistant quality of the panel.

Once the master mat is removed from the press, it can be cut into any dimension to meet the needs of the final user and the edges of the panels sealed with an edge seal coating.

It is understood by those skilled in the art that a continuous press could be used to manufacture overlay panels. One obvious change in the method would be that master mats would be cut to size after leaving the press.

B. Use of Panel for Wall Sheathing

Figure 7:
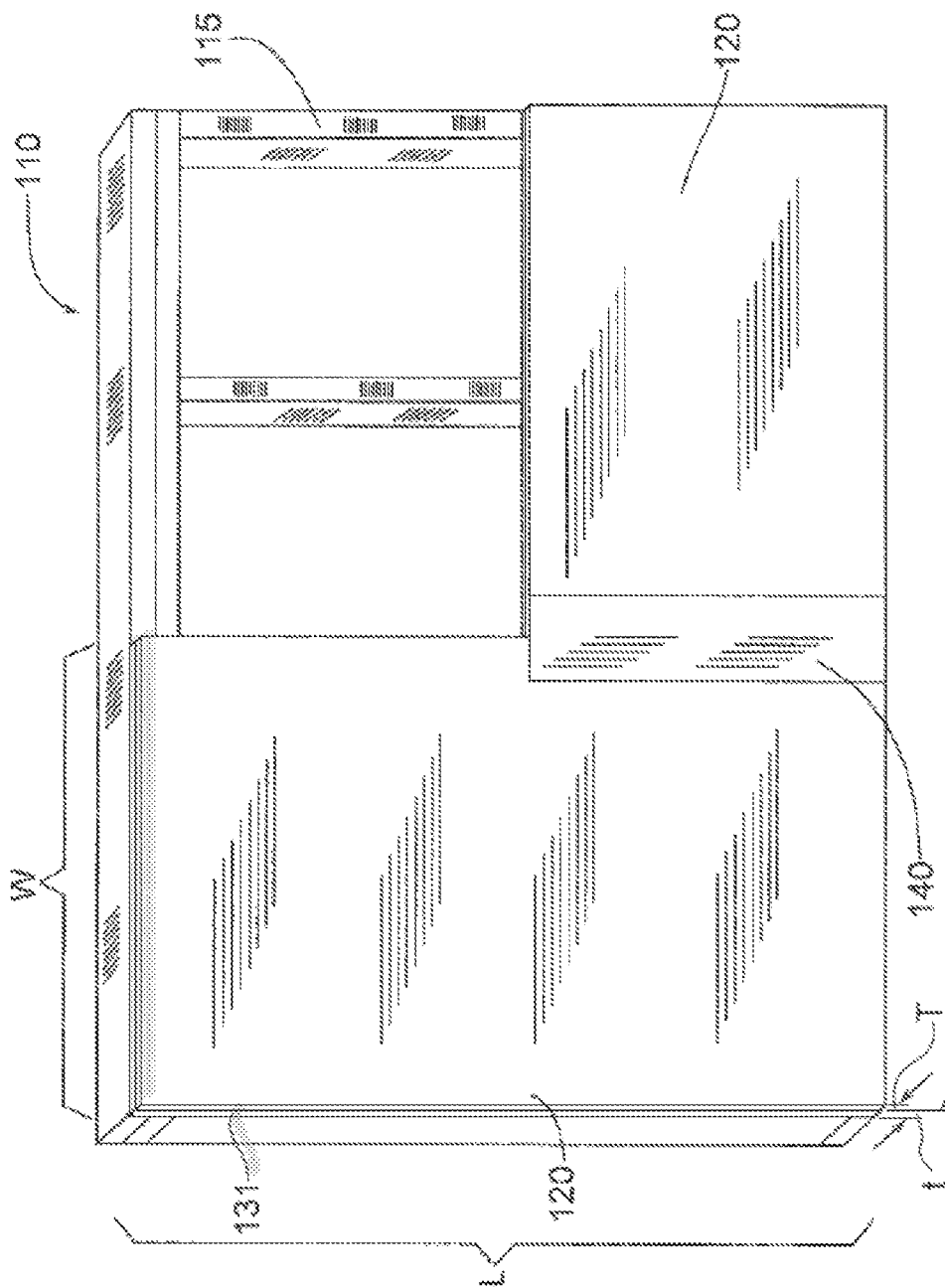
FIG. 7 is a perspective view of a three-dimensional wall sheathing system utilizing the panel assembly according to another embodiment, showing adjacent wall panels with lengths of tape sealing the seams/joints therebetween, each of the lengths of tape overlapping at least one of the seams/joints.

According to an alternate embodiment of the present invention, FIG. 7 shows structural insulated wall panel assemblies 120 joined to a building frame structure 115. Similar to the roof panels 20, the wall panels 120 each include a structural panel 126, a barrier layer 130 bonded on one surface, and an insulation layer 131 secured on another surface, and are generally attached to the building frame 115 in substantially abutting relationship with a plurality of fasteners such as nails, screws, or any other suitable fastener known in the art (not shown) so as to form seams or joints therebetween, as described above. Also similar to the roof panel 20, the wall panel 20 also may comprise a textured surface as described previously above. As such, the details of the roof panels 20 described above, including the components, their manufacture/assembling together, and the end use (as appropriate), apply to the wall panels 120.

Depending on the size of the panels 120 selected, the panels 120 may be installed with a horizontal or vertical orientation. In the exemplary embodiment shown in FIG. 7, panels 120 are installed vertically and horizontally and can typically be, but are not limited to a 1.219 m×2.438 m (4 ft.×8 ft.) construction. In a further aspect, a panel 120 may be 1.219 m×3.048 m (4 ft.×10 ft.), 1.219 m×3.658 m (4 ft.×12 ft.), or of any desired size for the particular build.

As described above, the panels 126 can be structural and can comprise a wood composite, such as veneers, strands, wafers, particles, fibers, and binders, or may be made from any building grade material as required for the particular build. In a further aspect, the preferred dimensions of the wall panels 120, including the length L, width W, and thickness T of the panel 120, can be designed to fit the particular application. In one aspect, the panel 120 has a one-half inch thickness T, however, in a further aspect, a 0.635 cm (quarter inch) to 3.175 cm (1.25-inch) thick panel 120 or thicker can be used if heavier construction is desired.

Figure 8:
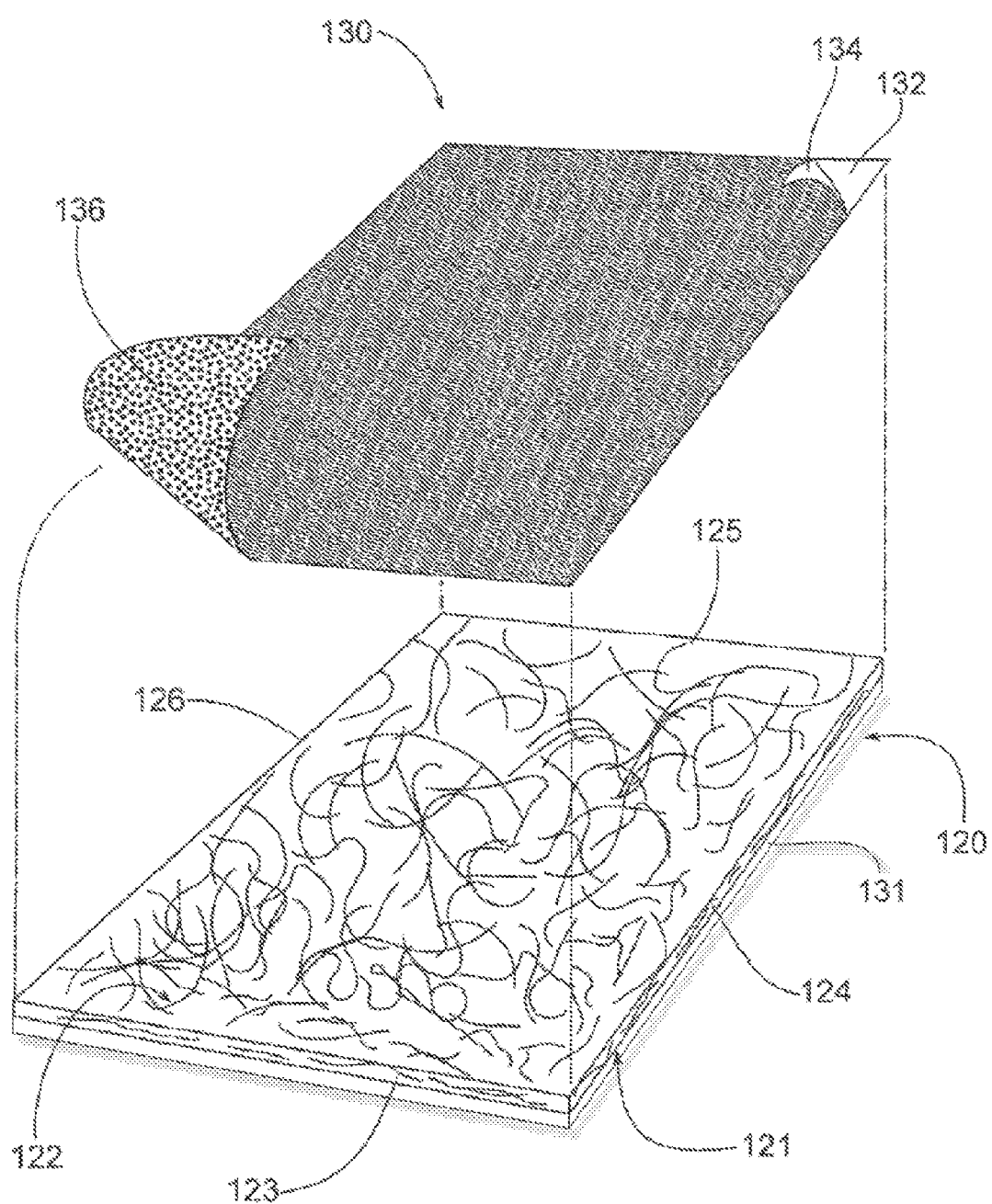
FIG. 8 is an exploded view of a panel assembly according to another example embodiment, showing a glueline for permanent bonding of the surface overlay member to the panel.
Figure 9A:
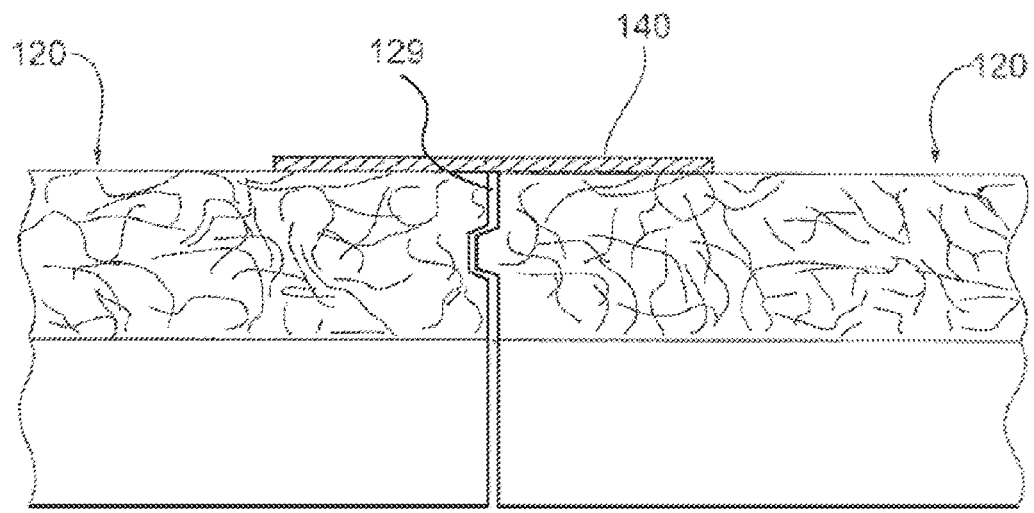
FIG. 9A is a partial cross-sectional view of two adjacent panel assemblies according to another example embodiment, showing tongue-and-groove connected panels after seam sealing.
Figure 9B:
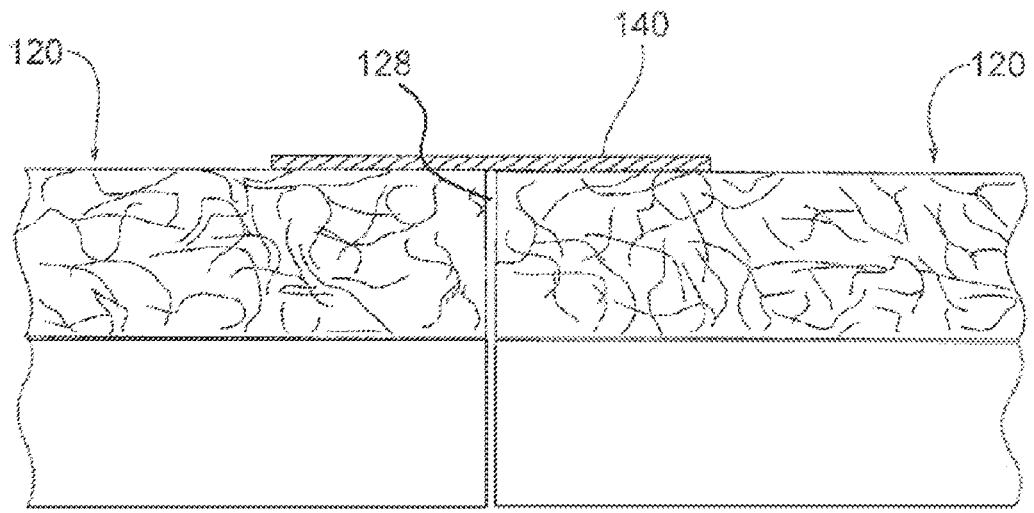
FIG. 9B is a partial cross-sectional view of two adjacent panel assemblies according to another example embodiment, showing edge abutting connected panels after seam sealing.

In one embodiment shown in FIG. 8, the structural panels 126 are quadrilateral in shape comprising an inward facing surface 121, an outward facing surface 122 and a peripheral edge, the peripheral edge defining a first 123, second 124, third 125 and fourth edge of the panel 120. In a further aspect, the first edge 123 of the panel is parallel with the corresponding third edge 125 of the panel, each of the first 123 and third 125 edges having opposing sections of equal length, and the second edge 124 of the panel is parallel with the corresponding fourth edge 126 of the panel, each of the second 124 and fourth edges having opposing sections of equal length. In a still further aspect, the first 123 and third 125 edges of the panel are substantially perpendicular with adjacent second 124 and fourth edges. In a further aspect illustrated in FIG. 9A, one or more of the edges of the panel 120 may provide at least one tongue-and-groove 129 shape for joining and securing panels 120 together.

Where the tongue-and-groove configuration is utilized, opposing edges have a groove or tongue compatible with an opposing corresponding edge and the length of the tongue in each section measured in the longitudinal direction of an edge is less than or equal to the longest grooves in each section. In an alternative aspect, as shown in FIG. 9B, the panels 120 can have flat edge surfaces 128 and be planar on all four peripheral edges 123, 124, 125.

In one aspect, as depicted in FIG. 8, a water-resistant barrier layer 130 is comprised of a paper 132 with at least two sides. During the construction stage of the panel assemblies 120, a water-resistant barrier layer 130 is bonded to each panel 126. In a further aspect, the barrier layer 130 can comprise an UV-resistant overlay, a radiant reflective layer, or the like. In a still further aspect, the barrier layer 130 is preferably comprised of three parts: paper 132, at least one of a resin 134, and a glueline layer 136, each of which may affect the durability and the final permeability of the panel 120. In a yet further aspect, the paper 132 has a paper basis weight of about 21.772 kg (48 lbs.) to about 102.058 kg (225 lbs.) per ream or a dry weight about 78.16 gm/m$^2$ (16 lbs./msf) to about 366.75 gm/m$^2$ (75 lbs./msf), however various basis weight papers 132 may be utilized for barrier layer 130. In an even further aspect, the paper 132 is preferably resin-impregnated with a resin 134 such as, but not limited to a phenol-formaldehyde resin, a modified phenol-formaldehyde resin, or other suitable resin. In a still further aspect, the paper has a resin content in a range of about 0% to about 80% by dry weight. In a yet further aspect, the paper has a resin content in a range of about 20% to about 70% by dry weight. In an even further aspect, the resin 134 may be saturated on 152 and then partially cured 153 to the paper 132. This enables the paper 132 to retain the resin 134 and makes the resin-impregnated paper 132 easier to handle.

In a further aspect, the water-resistant barrier layer 130 may optionally comprise an applied coating layer. In a still further aspect, one such coating is an experimental acrylic emulsion coating from Akzo-Nobel. In a yet further aspect, another suitable coating is Valspar's Black Board Coating. It is understood that by those skilled in the art that other classes of coatings may serve as an appropriate barrier layer. Thus, in various aspects, coatings may be used in combination with paper overlays to add desired functions to the panel.

Generally, an adhesive 136 is used to bond 155 the water-resistant barrier layer 130 to the outward facing surface of each of the plurality of panels 126. In a further aspect, the adhesive 136 is applied 154 to one side of the barrier layer 130 to facilitate attachment to the panels 126 during manufacture. In a still further aspect, a glueline layer 136 is of a range from about 4.885 gm/m$^2$ (1 lbs./msf) to about 244.5 gm/m$^2$ (50 lbs./msf). In an even further aspect, the glueline layer 136 has of a range from about 34.18 gm/m$^2$ (7 lbs./msf) to about 58.59 gm/m$^2$ (12 lbs./msf), creating a very efficient and durable bond. As mentioned previously, the glueline layer 136 may be composed from the group phenol-formaldehyde resin, hot-melt, PVA resin, or a combination thereof. In a further aspect, the glueline layer can be isocyanate-based.

According to various aspects, the water-resistant barrier layers 130 of the disclosed panels 120 are generally resistant to liquid (bulk) water but permeable to water vapor. For example, the barrier layers can have a water vapor permeance in a range from about 0.1 U.S. perms to about 50.0 U.S. perms, including exemplary water vapor permeance of 0.1, 1, 2, 5, 7, 10, 15, 20, 25, 25, 30, 35, 40, 45, 50 U.S. perms. According to further aspects, the barrier layer 130 can have any water vapor permeance value within any range derived from any of the above exemplified water vapor permeance values, including, for example, from about 0.1 to 20 perms.

Additionally, the water-resistant barrier layers 130 can have any desired water vapor transmission rate. For example, the barrier layers 130 can have a desired water vapor transmission rate from about 0.1 to about 25 g/m$^2$/24 hrs (at 73° F.—50% RH) according to ASTM E96 procedure A), including exemplary water vapor transmission rates of 0.1, 1, 2, 5, 7, 10, 15, 20, 25, 25 g/m$^2$/24 hrs. According to further aspects, the barrier layer 130 can have any water vapor transmission value within any range derived from any of the above exemplified water vapor transmission rates, including, for example, from about 0.7 to about 7 g/m$^2$/24 hrs.

In further aspects, the water-resistant barrier layers 130 can have a desired water vapor permeance from about 0.1 to about 50 U.S. perms (at 73° F.—50% RH) via ASTM E96 procedure B), including exemplary water vapor permeance of 0.1, 1, 2, 5, 7, 10, 15, 20, 25, 25, 30, 35, 40, 45, 50 U.S. perms. According to still further aspects, the barrier layer 130 can have any water vapor permeance within any range derived from any of the above exemplified water vapor permeance values, including, for example, from about 0.1 to about 12 U.S. perms.

The water-resistant barrier layers 130 can also have a liquid water transmission rate from about 1 to about 28 grams/100 in²/24 hrs (via Cobb ring) according to ASTM D5795. This test method allows the quantification of liquid water that passes through the underlayment to the underlying substrate and can be easily done on specimens where the underlayment cannot be removed for visual inspection.

According to further aspects, and as depicted in FIG. 8, the panel 120 for the panelized roof or wall system 110 can comprise an insulation layer 131 secured to the inward facing surface 121 of panel 126. Preferably, the insulation layer 131 at least substantially covers the inward facing surface 121 of the panels 120.

The insulation layer 131 can comprise any suitable insulation material conventionally known to one of ordinary skill in the art. For example, the insulation layer 131 can comprise a foam polymer insulation, including for example and without limitation, polyisocyanurate foam, polystyrene foam, polyurethane foam, or any combination thereof. In further exemplary aspects, the foam insulation layer 131 comprises polyisocyanurate foam. In still further aspects, the foam insulation layer 131 can comprise a blend or combination of a polyisocyanurate and polyurethane foam.

The foam insulation layer 131 can comprise extruded foam, expanded foam, or a combination thereof. As one of ordinary skill in the art will appreciate, extruded foams can be prepared by melting a suitable polymer material, incorporating a blowing agent to yield a foamed gel, and extruding the foamed gel through a die to form the desired foam layer. Expanded foams can be prepared by subsequent expansion of beads containing a blowing agent, wherein the expanded beads are molded at the time of expansion to form the desired foam layer.

The foam insulation 131 can have any desired density. For example, the foam insulation 131 can have a density of at least about 1, 2, 3, 4, 5, 6, 7, 8, 9, 10, 11, 12, 13, 14, 15, 16, 17, 18, 19, or even at least about 20 pounds per cubic feet (pcf) according to ASTM D1622. In further aspects, the foam insulation 131 can have a density in the range of about 1 pcf to about 20 pcf. In still further aspects, the foam insulation density can be any desired value within any range derived from any of the above exemplified values, including, for example, a density in the range from about 2 to about 5 pcf, or from about 1 to about 10 pcf.

The foam insulation 131 can be either closed cell or open cell. Open cell foam is more likely to let water vapor condense inside the cells, thereby reducing the insulation value. Thus, in further exemplary aspects, the foam insulation 131 is closed cell. In a further aspect, the foam insulation 131 is greater than about 50, 60, 70, 80, or even greater than about 90% closed-cell according to ASTM D2856.

Since water can negatively impact thermal performance, the foam insulation 131 preferably exhibits limited or substantially no water absorption. For example, the foam insulation 131 typically exhibits a water absorption of less than about 10, 9, 8, 7, 6, 5, 4, 3, 2, or even less than about 1% according to ASTM C209. In a further aspect, the foam insulation 131 exhibits a water absorption of less than about 10, 9, 8, 7, 6, 5, 4, 3, 2, or even less than about 1% according to ASTM C2842. In a still further aspect, the foam insulation 131 can exhibit a water absorption in the range of about 10 to about 0%. In a yet further aspect, the water absorption can be any desired value within any range derived from any of the above exemplified values, including, for example, a water absorption in the range from about O to about 5%, or from about 1 to about 3.5%.

Moreover, the foam insulation layer 131 can have any desired water vapor permeance (or transmission) value. For example, the water vapor permeance can be about 20, 15, 10, 9, 8, 7, 6, 5, 4, 3, 2, 1, or even about 0 perms according to ASTM E96. In a further aspect, the water vapor permeance can be in the range of about 0 to about 20 perms. In a still further aspect, the water vapor permeance can be any desired value within any range derived from any of the above exemplified values, including, for example, a water vapor permeance in the range from about 0 to about 2 perms, or from about 1 to about 5 perms.

The insulation layer 131 can have any desired thickness (t). This thickness (t) can be customized to fit any particular application and desired thermal resistance. For example, and without limitation, the thickness of the foam insulation layer 131 can be in the range of from about 0.25 in. (¼") to about 3 in. In further aspects, the thickness can be from about 0.5 in. to about 1 in. Depending on the intended application, the panel 120 can have any desired thermal resistance value (R-value). For example, the panel 120 can have an R-value of at least about 1, 2, 3, 4, 5, 6, 7, 8, 9, 10, 15, 20, 25 according to ASTM C1289-02. In a further aspect, the R-value can be in the range of about 1 to about 25. In still further aspects, the R-value can be any desired value within any range derived from any of the above exemplified values, including, for example, R-values in the range from about 1 to about 10, or from about 3 to about 7.

In various aspects, the insulation layer 131 can optionally comprise a membrane layer (not shown). The insulation membrane layer can comprise radiant barrier material, such as metal foil, for example, aluminum foil, polymeric film or fabric, paper or cellulosic material, reinforcing scrim, such as fiberglass scrim, or a combination thereof. In some aspects, the membrane layer comprises a single or multi-layered material which can be a laminate in which a backing material is laminated to a foam insulation layer 131. In other aspects, one or more optional additives can also be incorporated into or otherwise applied to the foam insulation layer 131. Exemplary and non-limiting additives can include flame retardants, colorants, ultraviolet absorbers, textured coatings, and the like as well as any combinations thereof.

The insulation layer 131 can be secured to the inward facing surface 121 of the panel 126, for example, by any conventionally used adhesive material known in the art to be compatible for use with foam insulation. For example, according to non-limiting aspects of the invention, the adhesive can be selected from a phenol-formaldehyde resin, hot-melt adhesive, polyvinyl acetate (PVA) resin, or any combination thereof. In still a further aspect, the adhesive can be isocyanate-based.

The insulated panels 120 disclosed herein can exhibit improved physical strength and durability over traditional sheathing panels or foam panels. Thus, in one aspect, the inventive insulated panels 120 can exhibit enhanced structural strength and dimensional stability when compared to a conventional or reference sheathing panels without an insulation layer when exposed to substantially the same environmental and/or physical forces under substantially similar conditions. To that end, the foam insulation layer 131 can have a dimensional stability of about less than 5, 4, 3, 2, or even less than about 1% according to ASTM D2126. In a further aspect, the dimensional stability is preferably about less than 2%. The foam insulation layer 131 can also have any desired compressive strength. For example, the foam insulation layer 131 can have a desired compressive strength of at least about 1, 5, 10, 15, 20, 25, 30, 35, 40 pounds per square inch (psi) according to ASTM D1621. In a further aspect, the compressive strength can be in the range of about 1 to about 40 psi. In a still further aspect, the compressive strength can be any desired value within any range derived from any of the above exemplified values, including, for example, a compressive strength in the range from about 15 to about 30 psi, or from about 20 to about 25 psi. Likewise, the foam insulation layer 131 can have any desired tensile strength. For example, the foam insulation layer can have a tensile strength of greater than about 300, 400, 500, 600, 700, 800, 900, 1000, 1500, 2000 pounds per cubic foot (pcf) according to ASTM D1623. In a further aspect, the tensile strength can be in the range of about 300 to about 2000 pcf. In a still further aspect, the tensile strength can be any desired value within any range derived from any of the above exemplified values, including, for example, a tensile strength in the range from about 500 to about 1000 pcf, or from about 600 to about 800 pcf.

In further aspects, the structural properties of the disclosed insulated panels 120 make the insulated panels suitable for use in numerous structural applications, while still providing improved thermal performance. For example, in one aspect, the inventive insulated panels 120 can be used as braced wall panels, when used in accordance with 2006 IBC Section 2308.3 and 2006 IRC Section R602.10.1 and installed in accordance with Table 5. In another aspect, the inventive insulated panels 120 are considered equivalent to Construction Method 3 described in Section 2308.9.3 of the 2006 IBC and Section R602.10.3 of the 2006 IRC. In another aspects, the inventive insulated panels 120 are suitable for use an alternative to wood structural panels in the construction of wood shear walls, when installed in accordance with 2006 IBC Section 2305.3 and Table 5. Allowable shear capacities for exemplary insulative panels are listed in Table 5 below.

The permeability of the tape (or other sealant) 140 used at the seams can be altered for the climatic zone (cold, mixed or hot/humid) and the building design used. In some climates in building designs, the tape may not need to be permeable since adequate permeability is available through the building envelope. In other climates in building designs, the tape will have to have a high level of permeability such that the moisture escapes from the interior spaces of the wall, and mold, fungus, etc. is not supported by the trapped moisture. Where a vapor barrier is required, the tape used will have a permeability of less than 1.0 US Perm.

In one aspect, the tape 140 comprises polyolefin (polyethylene preferred) backing of a thickness of about 2.5 mils. to about 4.0 mils. In a further aspect, adhesive (butyl preferred) layer deposed on said backing is of a thickness of about 8.5 mils. to about 30 mils. Where a permeable barrier is required, the tape has water vapor permeance of greater than 1.0 US perm at 73° F.—50% RH via ASTM E96 procedure B) and possibly, as high as 200 US perms or more.

Whether the tape 140 is impermeable or permeable to water vapor, it must be able to resist liquid water from entering into the building envelope. Since the seam tape will need to seal against the liquid water as traditional house wraps do, it is reasonable to require the tape to meet standards currently employed to measure liquid water penetration through house wraps, as would be readily known by one skilled in the art.

The technologies that are used to make films or fabrics with water vapor permeance greater than 1.0 US Perm are well known in the art. Tapes that have high water vapor permeance are often used in medical applications. Permeable tapes are made from a variety of processes and such

TABLE 5

| R-SHEATHING TYPE[4] | FRAMING | | FASTENERS[3] | | | ALLOWABLE[5] |
|---|---|---|---|---|---|---|
| | Nominal Stud Size (min.) | Max. Stud Spacing (inches) | Nominal Diameter (inches) | Edge/Field Spacing (inches) | Minimum Penetration Into Framing (inches) | SHEAR CAPACITY[6] (plf) |
| R-3 | 2-by-4 | 16 | 0.131 | 5/12 | 1.5 | 211 |
| R-3 | 2-by-4 | 16 | 0.131 | 4/12 | 1.5 | 261 |
| R-3 | 2-by-4 | 24 | 0.131 | 4/12 | 1.5 | 261 |
| R-6 | 2-by-4 | 16 | 0.131 | 4/12 | 1.5 | 232 |
| R-6 | 2-by-4 | 24 | 0.131 | 4/12 | 1.5 | 232 |

For SI: 1 inch = 25.4 mm; 1 pound per foot (ppf) = 14.59 N/m.
[1]All fasteners must be a minimum of 3/8 inch from panel edges.
[2]For framing of other species, the shear value above must be multiplied by the Specific Gravity Adjustment Factor = [1 − (0.55 − SG)], where SG = Specific Gravity of the framing lumber in accordance with the AF&PA NDS. This adjustment factor must not be greater than 1.
[3]Fasteners must be common nails or equivalent of a type generally used to attach wood sheathing.
[4]R-Sheathing Type R-6 panels have a foam plastic insulation thickness of 1.0 inch. R-Sheathing Type R-3 panels have a foam plastic insulation thickness of 0.5 inch.
[5]The shearwalls must have a maximum height-to-width aspect ratio of 2:1.
[6]The allowable shear capacity may be increased by 40% for wind in accordance with Section 2306.4.1 of the IBC.

In further aspects, as the plurality of resin-impregnated overlay bonded panels 120 are affixed to a building frame 115 in substantially abutting relationship, joints or seams are formed therebetween. Referring again to FIGS. 9A and 9B, enlarged cross sectional views of the system 110 show, for example, a plurality of strips of water-resistant pressure-sensitive seam sealant 140 for sealing the joints or seams between adjacent panels 120. In a further aspect, seam sealant 140 can, as understood by one skilled in the art, comprise laminate, caulk, foam, spray, putty, or other mechanical means. In a still further aspect, a plurality of strips of permeable tape 140 are used to seal seams between adjacent panels 120.

tapes may be made by bonding a pressure sensitive adhesive to a permeable layer. To improve strength, the permeable layer can be bonded to a woven or non-woven backing. In a further aspect, tapes may have in their structure permeable fabrics, coatings, membranes, or combinations thereof.

Conventionally, standard wood panels used in applications where the wall sheathing is intended to be structural are required to be directly secured to the building frame. Therefore, any additional thermal or insulative layer must be secured to the exterior facing of the building or between the framing members. As briefly described herein, external foam sheathing can have significant disadvantages, such as for example, it can easily become damaged during the construction process. Furthermore, when exposed to physical and environmental elements, thermal resistance performance can quickly deteriorate. Moreover, foam sheathing can limit exterior wall finishing options. In various aspects, the design of the present wall and roof system can further provide structure and durability, while enhancing thermal performance and eliminating thermal bridging.

In an exemplary embodiment of the invention, the installation configuration of the system 110 is shown in FIG. 7. In one aspect, the panels 120 are attached to the exterior facing sides of the building frame 115. In further aspects, the attachment pattern may be edge to edge, tongue-and-groove, or any other appropriate construction alignment. In yet further aspects, the panels 120 are secured to the building frame 115, with the foam insulation layer 131 facing inwardly, toward the interior of the building. As discussed herein, in certain applications, the disclosed insulated panels 120 can be used as structural sheathing in the construction of walls without additional structural bracing.

Since the disclosed panels 120 are preferably installed with the foam insulation layer 131 facing inwardly, the installation configuration also provides a nailable wood substrate panel 126 for exterior wall cladding, trim, or other accessories, while providing the increased thermal performance of a foam sheathing 131. In further aspects, the wood substrate panel 126 provides improved external security and durability over conventional foam sheathing. In still further aspects, the improved external durability improves long-term thermal and structural performance.

Conventional fasteners such as nails, ring-shank nails, screws, or other approved fasteners can be used to attach the panels 120 to the frame 115. In a further aspect, the structure is sealed by injecting, spreading or otherwise applying 157 a moisture proofing seam sealant 140 to each seam between adjoining panels 120 so as to create an impervious seam. There is no need for the seam sealant 140 to be flush with the exterior major panel surfaces or to bind it into the gap/seam between the panels 120. In a still further aspect, the seam sealant 140 can be applied over the exterior surfaces as shown in FIGS. 9A and 9B to assure that a sufficient seal occurs given possible panel thermal or strain cycling with changes in temperature or humidity. The seam sealant 140 is of various dimensions as required for the building.

In a further aspect, the presently described panels 120 may also comprise a radiant barrier material (not shown) attached to the inner face of the panel, i.e., to a face of the insulation layer 131 or the face of the panel 126 facing inwardly, toward the interior of the building. In a still further aspect, the radiant barrier material has a reflective surface that reflects infrared radiation that penetrates through the wall back into the atmosphere. The combination of this reflective function, as well as the foil's low emissivity, limits the heat transfer to the interior space formed in the interior of the building. By limiting the heat transfer, the interior space temperature is reduced, which in turn reduces the cost of cooling the house.

In a further aspect, the radiant barrier material can simply be a single layer radiant barrier sheet, such as metal foil, such as aluminum foil. In a still further aspect, the radiant barrier material can comprise a radiant barrier sheet adhered to a reinforcing backing layer made from a suitable backing material, such as polymeric film, corrugated paper board, fiber board or kraft paper. The backing material makes the foil material easier and more convenient to handle. In a further aspect, the multi-layered material may be a laminate in which a backing material is laminated to a radiant barrier sheet. In a still further aspect, the radiant barrier may be a coating.

In a further aspect, both the radiant barrier material and the barrier layer can be applied to the panel 126, for example, by spreading a coat of adhesive to the surface of the panel, applying the heat-reflecting material (or the barrier layer 130) over the adhesive onto the panel 126 and pressing the radiant barrier material (or barrier layer) onto the panel. After the adhesive dries or cures, the panel assembly 120 is ready for use.

In various aspects, the panel 120 of the present invention, when used for roof and wall sheathing, exhibits improved friction under some common conditions found on construction sites. In further aspects, the panel 120 of the presently described embodiment was preferably designed to achieve improved skid-resistance. In some aspects, when installing a wall sheathing, it is very important that the surface of the sheathing panels need to have sufficient skid resistance so that a person exercising reasonable care can work on the angled surfaces of the wall without ladder slippage.

Although preferable for panels to remain dry during installation on the construction site, the panels can be subject to moisture or wetness or have sawdust or other foreign materials deposited on their surface, which can reduce the coefficient of friction (CoF) and result in undesirable slippage. Sawdust is especially common on panel surfaces as panels often need to be cut to fit the wall or roof properly. Sawdust can be a significant problem as it may cause a reduction in the coefficient of friction of the sheathing panel surfaces. Accordingly, it is desired to remove as much sawdust as possible from the panel surfaces prior to leaning ladders or walking thereon. Although construction workers may take some efforts to clean the sawdust off the surface of the panels using a broom, tapping the board while on its edge, or using a leaf blower, these measures often prove to be inadequate. Specifically, these sawdust removal methods do not always completely remove the sawdust from the surface. Accordingly, a panel that restores adequate skid-resistance after removing as much sawdust as possible using any suitable means or method such as those described above is desired.

Improved performance after the removal of sawdust can be achieved, for example, in either of two ways. In a further aspect, one method of improving performance and retaining adequate friction after the removal of sawdust comprises using a saturating resin in the barrier layer 130 which has a slightly higher fraction of volatiles. The percent volatiles can be a relative reflection of the average molecular weight of the saturating resin. Accordingly, a slight change in the percent volatiles can result in a measurable change in the depth of embossing achieved in the final cure. In one aspect, about a 6% increase in volatiles (as measured in the present experimentation from 3.5% to about 3.7% of the total weight of the resin-saturated paper, including the glueline) resulted in improved embossing in that the measured depth of at least some of the embossed features was measured to be deeper. A thorough discussion of the overlay technology, including the measurement of volatiles, is found in U.S. Pat. No. 5,955,203.

In a further aspect, an additional method of improving the frictional characteristics of the panel 120 after the removal of sawdust was to change the type of wood furnish used to manufacture the paper in the paper overlay barrier layer 130. In a still further aspect, it was discovered that changing the furnish used in the manufacture of the barrier layer 130 from the typically used hardwood species to softwood species improved the retaining of friction after removal of sawdust.

To measure the friction in the presence of sawdust for the present embodiment, the coefficient of friction was measured using the English XL Tribometer. The standard techniques for using this equipment are described in ASTM F1679-04 and "Pedestrian Slip Resistance; How to Measure It and How to Improve It." (ISBN 0-9653462-3-4, Second Edition by William English). The standard methods were used to compare the various test surfaces and conditions. To test the sheathing panels with sawdust, the amount of sawdust deposited on the surface of a panel near a saw cut was measured. The sawdust deposited on a panel surface was measured by placing sheets of paper on the surface of a panel and making cuts at the edge of the paper using a circular saw with a new blade. The amount of sawdust produced by the saw was under these conditions was 2.5 g/ft$^2$. The sawdust had a size distribution as shown in Table 7 (Runs 1-4: 20 g samples; Run 5: 60 g sample; all 15 min. on vibration screen shaker.) That amount of sawdust was applied to and spread across the test specimen surface evenly as possible, then the CoF was measured using the English XL Tribometer. The sawdust was removed by tilting on its edge and tapping it with a hammer to "knock" the sawdust off and the specimen's CoF in this state was then measured. The wet condition was measured according to the procedure described at pg. 173 in "Pedestrian Slip Resistance; How to Measure It and How to Improve It." Since CoF can change depending on the surface, water was added in doses of about 1.54 g of water per test strike until the CoF remained constant. The CoF was measured for several configurations of sheathing panels and compared to existing sheathing materials as controls. The data are reported in Table 6.

In a further aspect, the overlay panel 120 has a texture on the surface that imparts a satisfactory CoF on the exterior surface of the panel 120. As described previously in the prior panel embodiments, the texture results from pressing a screen into the surface of the panel 126 and comprised major channels and minor indentations. In a still further aspect, the screen pattern is not symmetric, but has large channels that are roughly orthogonal to much smaller channels that are inside the larger channels. In a yet further aspect, the larger channels run up and down and the smaller channels run side to side when the panel is installed on a wall or roof. It was found that a small difference in CoF was measured depending on the test direction. The average of four measurements (N, E, S, and W) is reported and the testing shown in the following tables was initiated so that the first measurement was taken with respect to the textured surface. N and S is measured along the direction of the major channels and E and W is measured generally orthogonally with the major channels. It was noted that some very small differences in CoF could be measured depending on the axis (N-S vs. E-W) along which the measurements were taken. It is also expected that the conditions under which the test is conducted will have some affect on the measured CoF. Variations in temperature and humidity may also have an affect on the measured CoF.

In further aspects, the texture preferably has a number of features or elements disposed in a first direction and a number of features or elements disposed in a second direction. In still further aspects, the elements or features disposed in first and second directions may be of similar or may be of different sizes. In yet further aspects, the elements similarly may be of different or of similar shapes. Non-limiting examples of similarly sized features include an embossed herringbone or an embossed basket weave configuration. In an even further aspect, a herringbone pattern may be very tightly disposed or may be somewhat "spread-out" in such a manner so that major channels with minor indentations are created.

In further aspects, the embossed textured surface is more preferably comprised of a plurality of major or primary textured features and a plurality of minor or secondary textured features. In still further aspects, the minor or secondary textured features are at least partially disposed on one or more corresponding major feature. Thus, in one aspect, while the general appearance of the exemplary textured surface 35 appears to be a random pattern of raised areas, a closer examination of the exemplary textured surface reveals finer detail. In further aspects, the exemplary textured surface 35 includes a plurality of major channels 33 that are disposed substantially parallel with a pair of opposing edges (preferably the shorter pair of opposing edges) of the panel. In still further aspects, a plurality of minor indentations 34 are disposed within the major channels 33 and run generally orthogonally to the major channels.

In various aspects, the present invention provides for advantageous slip-resistance by providing any number of major channels. In further aspects, the density of the major channels is about 5 to about 15 major channels per 2.54 cm (inch) as measured in a direction perpendicular to the direction of the major channels. In still further aspects, the density of the major channels is about 9 to about 12 major channels per 2.54 cm (inch) as measured in a direction perpendicular to the direction of the major channels. On a typical 1.219 m×2.438 m (4'×8') sheathing panel 120, the major channels will preferably run generally across the 1.219 m (4') or short direction. It should be appreciated that it is not necessary nor required that the major channels be exactly parallel and may undulate slightly from side to side in a some what serpentine fashion rather than being straight.

In various aspects, the minor indentations 34 according to the present invention may vary in length and width. In further aspects, the minor indentations 34 preferably have an elongated shape that measures preferably from about 0.0508 cm (0.020 inches) to about 0.254 cm (0.100 inches) in length and from about 0.0254 cm (0.010 inches) to about 0.254 cm (0.100 inches) wide. In various further aspects, the present invention provides for advantageous slip-resistance by providing any number of minor indentations. In further aspects, the density of the minor indentations is about 15 to about 35 of the minor indentations per inch as measured along the direction of the major channels. In still further aspects, the long direction of the minor indentations preferably extends generally across the eight-foot (or long) direction of a typical panel.

In accordance with the exemplary configuration of the textured surface 35, in a typical roof sheathing application using 1.219 m×2.438 m (4'×8') panels where the 2.438 m (8') edge of the sheathing panel is parallel to the floor of the home, the major channels 33 will generally be oriented up and down, while the long direction of the minor indentations 34 will generally run across the roof. In a further aspect, the depth of the major channels and minor indentations have been found to be in a range of about 5 to about 35 mils as measured by the Mitutoyo Surface Profiler. It should be appreciated that at least some of the major channels and minor indentations may be of a depth greater or deeper than the thickness of the paper (i.e., some of the major channels and minor indentations may be of a depth that would project into the surface of the panel).

For preparation of the test panels for the presently described embodiment, the overlay papers were bonded to mats in a primary process either in the lab or on the regular manufacturing line. Then, test specimens were cut from these panels. The conditions used to prepare the test panels in the laboratory were approximately: Press time: 5 minutes; Press temp: 200° C.; panel dimensions: 40.64 cm×40.64 cm×1.27 cm (16"×16"×0.5") thick; target density: 41.5 pcf; wood species: mixtures of pine; resin loading: face; MDI @ 4%; PPP @ 2% Core; MDI @ 4.5%; and wax loading: 2%.

TABLE 6

The CoF data for improved sheathing panels.

| Specimen | Condition | Average CoF | N-S CoF | E-W CoF |
|---|---|---|---|---|
| Softwood overlay paper | Dry | 0.83 | 0.79 | 0.87 |
|  | Wet | 0.77 | 0.76 | 0.78 |
|  | Sawdust | 0.48 | 0.47 | 0.47 |
|  | After Sawdust | 0.85 | 0.77 | 0.92 |
| High volatiles overlay | Dry | 0.83 | 0.79 | 0.86 |
|  | Wet | 0.82 | 0.83 | 0.81 |
|  | Sawdust | 0.42 | 0.41 | 0.43 |
|  | After Sawdust | 0.83 | 0.80 | 0.85 |
| OSB | Dry | 0.86 | 0.84 | 0.87 |
|  | Wet | 0.80 | 0.80 | 0.80 |
|  | Sawdust | 0.54 | 0.51 | 0.58 |
|  | After Sawdust | 0.72 | 0.73 | 0.71 |
| Plywood | Dry | 1.0 | >1 | >1 |
|  | Wet | 0.84 | 0.83 | 0.85 |
|  | Sawdust | 0.53 | 0.54 | 0.52 |
|  | After Sawdust | 0.62 | 0.61 | 0.63 |

The measurements in Table 6 were taken under conditions of higher temperature and humidity as compared with earlier described testing conditions.

TABLE 7

Particle size distribution of sawdust used to measure CoF.

| Sieve No. | Opening size (in microns) | Run #1 | Run #2 | Run #3 | Run #4 | Run #5 |
|---|---|---|---|---|---|---|
| 18 | 1000 | 0.19 | 0.21 | 0.19 | 0.18 | 0.47 |
| 30 | 600 | 0.6 | 0.83 | 0.68 | 0.58 | 2.17 |
| 60 | 250 | 3.44 | 4.57 | 3.42 | 3.40 | 9.90 |
| 80 | 180 | 3.53 | 3.15 | 2.98 | 2.72 | 8.76 |
| 100 | 150 | 1.30 | 2.52 | 4.28 | 1.17 | 3.10 |
| 140 | 106 | 4.71 | 5.13 | 3.23 | 2.32 | 9.78 |
| 200 | 75 | 1.12 | 1.54 | 1.79 | 2.28 | 6.48 |
| 325 | 45 | 4.07 | 1.55 | 4.11 | 3.87 | 10.79 |
| pan | 0 | 0.57 | 0.07 | 1.92 | 2.97 | 8.00 |

C. Reinforced Panel for Use as Wall or Roof Sheathing

Figure 16:
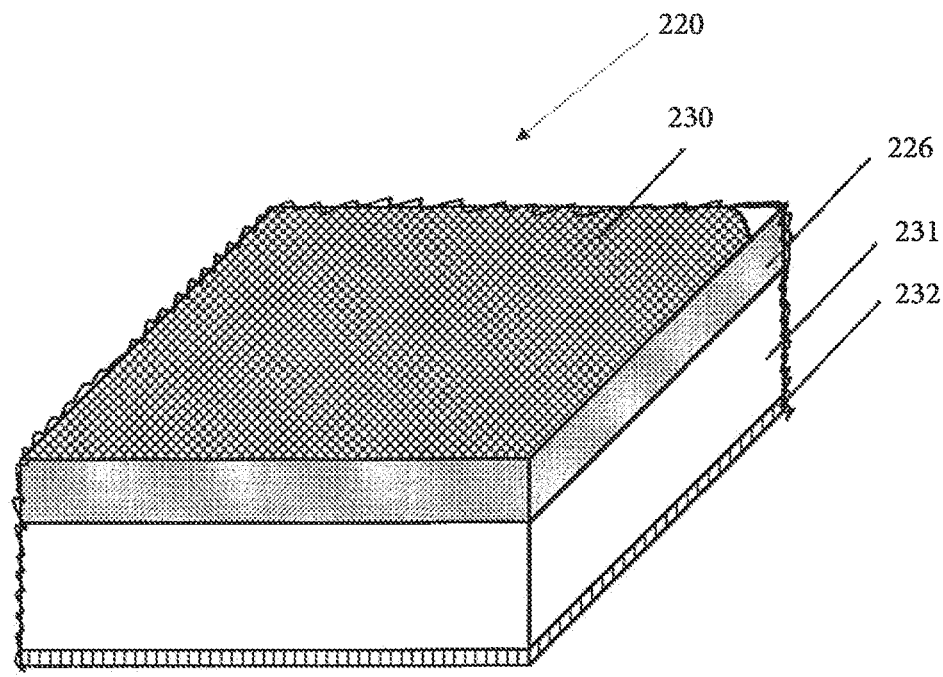
FIG. 16 is an exploded perspective view of a portion of a panel assembly according to another example embodiment.
Figure 17:
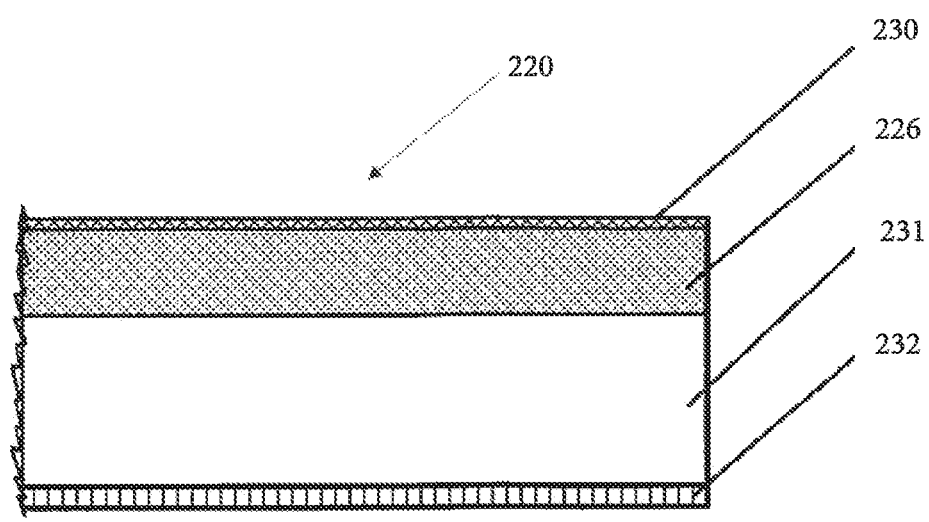
FIG. 17 shows the panel assembly portion of FIG. 16 in an assembled state.

In additional embodiments, reinforcement is added to a roof panel assembly 20 or a wall panel assembly 120 of the embodiments described above to form a reinforced structural insulated panel assembly for use in a panelized sheathing system for a building structure. FIGS. 16 and 17 show a reinforced structural insulated panel assembly 220 according to an example embodiment. The panel assembly 220 can be used as a roof panel and/or a wall panel in panelized sheathing systems for building construction.

The panel assembly 220 includes a structural panel 226 with an inward-facing major surface and an outward-facing major surface, a water-resistant barrier layer 230 secured to the outward-facing surface of the panel 226, and an insulation layer 231 secured to the inward-facing surface of the panel 226. The water-resistant barrier layer 230 and the insulation layer 231 are typically coextensive with the structural panel 226, so they cover substantially all of the two major surfaces of the structural panel 226. The structural panel 226 (e.g., OSB), the water-resistant barrier layer 230 (e.g., saturated kraft paper overlay), and the insulation layer 231 (e.g., closed-cell foam) can all be of the same or similar type and construction as the respective layers in the panel assemblies 20 and 120 described above, so for brevity the details of these components, and their manufacture and assembly together, are not repeated.

In this embodiment, the panel assembly 220 additionally includes a reinforcing layer 232 secured to the insulation layer 231 opposite the structural panel 226. That is, the reinforcing layer 232 is secured to the inward-facing major surface of the insulation layer 231, and is thus on the opposite side of the insulation layer from the structural panel 226, which is secured to the outward-facing surface of the insulation layer 231. The reinforcing layer 232 can be secured to the insulation layer 231 by an adhesive for example of the same type as used to secure the insulation later 231 to the structural panel 226. The structural panel 226, the water-resistant barrier layer 230, the insulation layer 231, and the reinforcing layer 232 of each panel assembly 220 are thus pre-formed into an integral four-layer arrangement. In use, each pre-formed panel assembly 220 is placed external to the structural frame of the building being constructed, with its reinforcing layer 232 facing inward toward the structural frame, and fastened securely in place to the structural frame members (e.g., wall studs or roof rafters) by fasteners (e.g., nails) extending all the way through the pre-formed panel assembly 220 and into the structural frame. In typical embodiments, the reinforcing layer 232 is the innermost layer of the panel assembly 220, so during installation it is positioned abutting the structural frame of the building.

Because of the added reinforcing layer 232, the reinforced panel assembly 220 has a higher shear capacity than the panel assemblies 20 and 120 described above. This higher shear capacity can be of particular benefit for applications where a building is to be designed and constructed to withstand forces greater than typical, for example in locations subject to seismic forces, hurricane-strength winds, or other extreme lateral loads. In some embodiments, a panelized sheathing system made using a number of the reinforced panel assemblies 220 exhibits at least the minimum allowable shear capacity (plf) for braced wall panels constructed according to method 3 described in 2006 International Building Code (IBC) Section 2308.9.3, and as determined in accordance with 2006 IBC and International Code Council Evaluation Service (ICC-ES) Acceptance Criteria 269 (AC269). In some embodiments, a panelized sheathing system made using a number of the reinforced panel assemblies 220 is able to withstand seismic shear forces with an allowable shear value of 400 lbs. per linear foot (plf).

The reinforcing layer 232 is sufficiently strong and thick to provide the desired additional structural strength to the panel assembly 220, but sufficiently light-weight and thin that it does not add significant additional weight or size to the panel assembly so that the panel assembly is still easy to handle on the job site manually by workers without hoisting machinery. For example, in typical embodiments the panel assembly 220 is provided in a 4 foot by 8 foot size, with the layer thicknesses described herein, and with a weight of about 80 lbs. or less, in some embodiments about 60 lbs.

As such, the reinforcing layer 232 has a thickness that is less than a thickness of the structural panel 226. In example embodiments, the structural panel 226 has a thickness of about 0.375 in. (⅜ in.) to about 0.5 in. (typically, about 0.4375 or 7/16 in.), and the reinforcing layer 232 has a thickness of about 0.0625 in. (1/16 in.) to about 0.167 in. (1/6 in.) (typically, 0.125 in. or 1/8 in.). The structural panel 226 and the reinforcing layer 232 are secured to and sandwich the insulation layer 231, which in example embodiments has a thickness of about 0.5 in. to about 2.0 in. In another aspect, the thickness of the reinforcing layer 232 is about 10% to about 50%, about 12.5% to about 44.5%, about 20% to about 35%, or about 28.5% of the thickness of the structural panel 226.

In example embodiments, the structural panel 226 of each panel assembly 220 is a rigid panel or board, for example made of wood or wood composite material such as OSB, plywood, particleboard, chipboard, medium-density fiberboard, or waferboard. The reinforcing layer 232 has a lower strength (and typically a lower cost) than the structural panel 226, and thus can be made of a lower strength (and lower cost) material for example a wood composite sheet such as pressure-laminated plies of cellulosic fiber (e.g., THERMO-PLY green/light structural grade cardboard), high-density fiberboard (i.e., hardboard), low-density fiberboard (e.g., particle board), another sheet of pressure-laminated plies of cellulosic fibers, plywood veneer, or another wood composite layer. But the reinforcing layer 232 is not a "structural panel," as defined herein and understood by persons of ordinary skill in the art. Thus, while the structural panel 226 is PS 1 or PS 2 rated, so that the panel assembly 226 is structural-rated, the reinforcing layer 232 is not structural-rated, but it still provides the desired added strength to increase the allowable shear resistance capacity of the panel assembly 220. For example, the non-structural reinforcing layer 232 can be made of THERMO-PLY green/light structural grade cardboard, which is identified as "light structural grade" in marketing materials, but which is not PS 1 rated, PS 2 rated, or otherwise "structural" as defined herein.

The reinforced panel assembly 220 has been described above as for use in a panelized sheathing system including a sealant (e.g., adhesive tape) for the seams between adjacent panel assemblies. It will be understood by persons of ordinary skill in the art, however, that the reinforced panel assembly 220 can be used in other building construction applications without seam sealants.

In further aspects, the present invention also relates to various methods and systems using the disclosed insulated panel assemblies. For example, according to aspects of the invention, described herein is a panel system to externally envelope a structure, the system comprising: a) at least two panel assemblies each aligned with an edge proximate to an edge of at least one adjacent panel assembly to form a seam therebetween, each panel assembly including i) a structural panel having an outer surface and an inner surface; ii) a barrier layer secured to at least the outward facing surface of the panel, the barrier layer being substantially bulk water resistant; iii) an insulation layer secured to the inward facing surface of the panel; and iv) a reinforcing layer secured to the insulation layer opposite the structural panel; and b) a bulk water resistant sealant sealing at least one seam or gap between the adjacent panel assemblies.

In another aspect, described herein is a panelized sheathing construction system for abuilding comprising: a) a building frame structure; b) a plurality of panel assemblies attached to the frame structure in substantially abutting relationship so as to form seams or joints therebetween, each one of the panel assemblies including i) a structural lignocellulosic panel having a first inward facing surface and a second outward facing surface; ii) a substantially bulk water resistant barrier layer secured to at least the second outward facing surface of the panel; iii) an insulation layer secured to the inward facing surface of the panel; and iv) a reinforcing layer secured to the insulation layer opposite the structural panel; and a plurality of water-resistant sealants, each of said sealants sealing at least one of the seams between the adjacent panel assemblies.

In another aspect, described herein is a method for drying-in a building comprising the steps of: a) providing a building frame structure in a staged or completed condition; b) providing a plurality of panel assemblies, each panel assembly comprising i) a lignocellulosic panel having an inward facing surface and an outward facing surface; ii) a bulk water-resistant barrier layer secured to the outward facing surface of the panel; iii) an insulation layer secured to the inward facing surface of said panel; and iv) a reinforcing layer secured to the insulation layer opposite the structural panel; and c) sealing the seams/joints between the adjacent panels.

In another aspect, described herein is a panelized sheathing construction system for abuilding having a frame structure comprising: a) first and second composite panel assemblies attached to the frame structure in a substantially abutting arrangement so as to form a seam or joint therebetween, wherein each of the first and second panel assemblies includes i) a structural panel having an inward facing surface and an outward facing surface; ii) a substantially bulk water resistant barrier layer secured to at least the outward facing surface of the panel; iii) an insulation layer secured to the inward facing surface of the panel; and iv) a reinforcing layer secured to the insulation layer opposite the structural panel; and b) a water-resistant seal that covers the seam/joint between the first and second panels.

While the present invention has been described with respect to several exemplary embodiments, a number of design modifications and additional advantages may become evident to persons having ordinary skill in the art. While the illustrative embodiments have been described in considerable detail, it is not the intention of the applicant to restrict or in any way limit the scope of the appended claims.

The invention claimed is:
1. A structural sheathing and insulating system for a building having a structural frame, the system comprising:
at least two adjacent panel assemblies, each panel assembly having at least one edge and including:
a structural panel having an outer surface and an opposite inner surface, wherein the structural panel is PS 1 or PS 2 rated so that the panel assembly is structural-rated;
a water-resistant barrier layer secured to the outer surface of the structural panel;
an insulation layer secured to the inner surface of the structural panel; and
a reinforcing layer secured to the insulation layer opposite the structural panel, wherein the reinforcing layer is not structural-rated but provides added strength to increase a shear capacity of the panel assembly,
wherein the structural panel, the water-resistant barrier layer, the insulation layer, and the reinforcing layer of each panel assembly are pre-formed into an integral four-layer arrangement, and wherein each of the panel assemblies aligns with its at least one edge proximate to the at least one edge of the adjacent panel assembly to define a longitudinal seam between the two adjacent panel assemblies; and a water-resistant sealant that seals the longitudinal seam between the proximate edges of the adjacent panel assemblies, wherein in use each pre-formed panel assembly is placed external to the structural frame, with its reinforcing layer facing inward toward the structural frame, and fastened securely in place to the structural frame by fasteners extending all the way through the pre-formed panel assembly and into the structural frame.

2. The system of claim 1, wherein the insulation layer of each panel assembly is foam insulation comprising polyisocyanurate foam, polystyrene foam, polyurethane foam, or a combination thereof.

3. The system of claim 1, wherein the insulation layer of each panel assembly has a density in the range of about 1 to about 20 pounds per cubic feet (pcf) according to ASTM D1622.

4. The system of claim 1, wherein the insulation layer of each panel assembly has a water absorption of less than about 10% according to ASTM C209 or ASTM C2842 and a water vapor permeance from about 0.1 to about 20 perms as determined according to ASTM E96.

5. The system of claim 1, wherein in use the installed structural sheathing and insulating system exhibits a thermal resistance value (R-value) from about 1 to about 15 according to ASTM C1289-02.

6. The system of claim 1, wherein the insulation layer of each panel assembly is secured to the respective structural panel by an adhesive selected from a phenol-formaldehyde resin, hot-melt adhesive, polyvinyl acetate (PVA) resin, or a combination thereof.

7. The system of claim 1, wherein the insulation layer of each panel assembly has a dimensional stability of about less than 5% according to ASTM D2126.

8. The system of claim 1, wherein the insulation layer of each panel assembly has a compressive strength of at least about 5 pounds per square inch (psi) according to ASTM D1621.

9. The system of claim 1, wherein the insulation layer of each panel assembly has a tensile strength of greater than about 300 pounds per cubic foot (pcf) according to ASTM D1623.

10. The system of claim 1, wherein the structural panel and the reinforcing layer of each panel assembly are made of wood or wood composite material selected from the group consisting of oriented strand board, plywood, particleboard, chipboard, medium-density fiberboard, and waferboard.

11. The system of claim 1, wherein the reinforcing layer of each panel assembly has a thickness that is less than a thickness of the respective structural panel.

12. The system of claim 11, wherein the structural panel thickness is about 0.375 in. to about 0.5 in., and the reinforcing layer thickness is about 0.0625 in. to about 0.167 in.

13. The system of claim 12, wherein the insulation layer of each panel assembly has a thickness of about 0.5 in. to about 2.0 in.

14. The system of claim 11, wherein the reinforcing layer thickness is about 10% to about 50%, about 12.5% to about 44.5%, about 20% to about 35%, or about 28.5% of the structural panel thickness.

15. The system of claim 1, wherein the water-resistant barrier layer of each panel assembly is bulk water resistant and water vapor permeable.

16. A structural sheathing and insulating system for a building having a structural frame, the system comprising:

at least two adjacent panel assemblies, each panel assembly having at least one edge and including:
a structural panel having an outer surface and an opposite inner surface;
a water-resistant barrier layer secured to the outer surface of the structural panel;
an insulation layer secured to the inner surface of the structural panel; and
a reinforcing layer secured to the insulation layer opposite the structural panel, wherein the structural panel the water-resistant barrier layer, the insulation layer, and the reinforcing layer of each panel assembly are pre-formed into an integral four-layer arrangement, and wherein each of the panel assemblies aligns with its at least one edge proximate to the at least one edge of the adjacent panel assembly to define a longitudinal seam between the two adjacent panel assemblies; and a water-resistant sealant that seals the longitudinal seam between the proximate edges of the adjacent panel assemblies, wherein in use each pre-formed panel assembly is placed external to the structural frame, with its reinforcing layer facing inward toward the structural frame, and fastened securely in place to the structural frame by fasteners extending all the way through the pre-formed panel assembly and into the structural frame, and wherein in use the installed structural sheathing and insulating system exhibits at least the minimum allowable shear capacity (pounds per linear feet (plf)) for braced wall panels constructed according to method 3 described in 2006 International Building Code (BC) Section 2308.9.3, and as determined in accordance with 2006 IBC and International Code Council Evaluation Service (ICC-ES) Acceptance Criteria 269 (AC269).

17. The system of claim 16, wherein the reinforcing layer of each panel assembly has a thickness that is less than a thickness of the respective structural panel.

18. A structural sheathing and insulating system for a building having a structural frame, the system comprising:

at least two adjacent panel assemblies, each panel assembly having at least one edge and including:
a structural panel having an outer surface and an opposite inner surface, wherein the structural panel is made of a lignocellulosic material;
a water-resistant barrier layer secured to the outer surface of and coextensive with the structural panel;
an insulation layer secured to the inner surface of the panel; and
a reinforcing layer secured to the insulation layer opposite the structural panel, wherein the reinforcing layer is made of a lignocellulosic material and has a thickness that is less than about 50% of a thickness of the respective structural panel, and wherein the reinforcing layer is not structural-rated but provides added strength to increase a shear capacity of the panel assembly;

wherein the structural panel, the water-resistant barrier layer, the insulation layer, and the reinforcing layer of each panel assembly are pre-formed into an integral four-layer arrangement, and wherein each of the panel assemblies aligns with its at least one edge proximate to the at least one edge of the adjacent panel assembly to define a longitudinal seam between the two adjacent panel assemblies; and a water-resistant sealant that seals the longitudinal seam between the proximate edges of the adjacent panels, wherein in use each pre-formed panel assembly is placed external to the structural frame, with its reinforcing layer facing inward toward the structural frame, and fastened securely in place to the structural frame by fasteners extending all the way through the pre-formed panel assembly and into the structural frame, wherein in use the installed structural sheathing and insulating system exhibits at least the minimum allowable shear capacity (pounds per linear feet (plf)) for braced wall panels constructed according to method 3 described in 2006 International Building Code (IBC) Section 2308.9.3, and as determined in accordance with 2006 IBC and International Code Council Evaluation Service (ICC-ES) Acceptance Criteria 269 (AC269), and wherein in use the installed structural sheathing and insulating system is structural without installing additional structural bracing.

19. The system of claim 18, wherein the structural panel of each panel assembly and the respective reinforcing layer comprise oriented strand board, plywood, particleboard, chipboard, medium-density fiberboard, or waferboard.

20. The system of claim 18, wherein the structural panel of each panel assembly has a thickness of about 0.375 in. to about 0.5 in., the respective insulation panel has a thickness of about 0.5 in. to about 2.0 in., and the respective reinforcing layer has a thickness of about 0.0625 in. to about 0.167 in.

* * * * *